United States Patent [19]  [11] 3,887,601
Kanner et al.  [45] June 3, 1975

[54] ORGANOSILICONE POLYMERS

[75] Inventors: Bernard Kanner, Nyack; Bela Prokai, Mahopac, both of N.Y.; Walter R. Rosemund, Englewood, N.J.

[73] Assignee: Union Carbide Corporation, New York, N.Y.

[22] Filed: July 26, 1973

[21] Appl. No.: 382,863

Related U.S. Application Data

[62] Division of Ser. No. 293,415, Sept. 29, 1972, Pat. No. 3,796,676.

[52] U.S. Cl.... 260/448.2 B; 260/2.5 AH; 260/46.5 Y; 260/448.8 R
[51] Int. Cl. ......... C07f 7/08; C07f 7/10; C07f 7/18
[58] Field of Search... 260/448.2 B, 2.5 AH, 448.8 R, 260/46.5 Y

[56] References Cited
UNITED STATES PATENTS
3,480,583 11/1969 Bailey et al. ............ 260/448.2 B X
3,793,360 2/1974 Prokai et al. ................. 260/448.2 B
3,796,676 3/1974 Kanner et al. ............ 260/448.2 B X

*Primary Examiner*—Paul F. Shaver
*Attorney, Agent, or Firm*—M. Klosty

[57] ABSTRACT

Organosilicone polymers are provided containing silicon-containing units A, B and C, where A is $SiO_{4/2}$, B is a monofunctional siloxy unit in which silicon is bonded to at least one organic moiety bearing an organic-capped poly(oxyalkylene) chain, and C is a monofunctional trihydrocarbylsiloxy unit, and in which there are from about 0.75 to about 2 moles of A, and from about 0.1 to about 1 mole of C, per mole of B. The polymers are useful as surfactants and find particular application in the manufacture of flexible polyester urethane cellular products, including flame-retarded foams.

26 Claims, No Drawings

ORGANOSILICONE POLYMERS

This is a division of application Ser. No. 293,415 filed Sept. 29, 1972, now U.S. Pat. No. 3,796,676.

BACKGROUND OF THE INVENTION

The present invention relates to novel organosilicone polymers, and their use in the manufacture of urethane cellular products, particularly flexible polyester urethane foams including flame-retarded foams.

It is well known that the urethane linkages of urethane foams are formed by the exothermic reaction of a polyfunctional isocyanate and a polyfunctional active hydrogen-containing compound in the presence of a catalyst, and that the cellular structure of the foamed product is provided by gas evolution and expansion during the urethane-forming reaction. In accordance with the "one-shot process" which is the most widely used industrial technique, direct reaction is effected between all of the raw materials which include the polyisocyanate, the active hydrogen-containing compound, the catalyst system, blowing agent and surfactant. A major function of the surfactant is to stabilize the urethane foam, that is, prevent collapse of the foam until the foamed product has developed sufficient gel strength to become self-supporting.

It also is well known that suitable active hydrogen-containing compounds include polyether polyols and polyester polyols. From the standpoint of their chemical structure, therefore, urethanes are usually classified as polyether and polyester urethanes, respectively. Cellular urethanes also differ with respect to their physical structure and, from this standpoint, are generally classified as flexible, semi-flexible or rigid foams.

Although certain techniques of urethane manufacture such as the "one-shot process" and certain components of the foam formulation such as the polyisocyanates, amine catalyst and blowing agent, are generally useful, a specific problem associated with the production of a particular type of urethane foam and the solution thereto are often peculiar to the particular chemical and physical structure of the desired foamed product. Thus, a significant development in the production of a polyether foam or a rigid foam, for example, may not be generally applicable to the production of other cellular products. In particular, the efficacy of the foam stabilizer is usually selective with respect to the formation of a particular type of foam. For example, although flexible polyester foam was originally made using conventional organic surfactants or emulsifiers, such compounds were not effective for the manufacture of flexible polyether foam. As urethane technology advanced and end-uses increased, it became apparent that certain deficiencies in the quality of flexible polyester foam such as the presence of splits and a non-uniform cell structure were attributable, at least in part, to the organic surfactants employed. However, the mere substitution of the organic surfactants with various polysiloxane-polyoxyalkylene block copolymers which had been used as foam stabilizers with satisfactory results in the production of other types of urethane foams (e.g., in the production of polyether urethane foams and certain rigid polyester urethane foams), did not produce completely satisfactory flexible polyester foams. A significant development in polyester foam manufacture was the discovery that a satisfactory combination of uniform cell structure and freedom from splits was achieved by using a particular combination of foam stabilizing ingredients. This latter combination comprises: (a) an anionic organic surfactant that is soluble in the polyester polyol reactant at room temperature and capable of lowering the surface tension of the polyester resin reactant when dissolved therein, and (b) a polysiloxane-polyoxyalkylene block copolymer surfactant characterized by a particular molecular weight (from 600 to 17,000), siloxane content (from 14 to 40 weight percent based on the weight of the copolymer) and oxyethylene content (at least 75 weight percent based on the total amount of oxyalkylene groups in the copolymer). This particular advance in polyester foam manufacture is described in greater detail in U.S. Pat. No. 3,594,334.

Another class of organosilicone polymers known to the art are those composed of the following two types of silicon-containing units: (1) inorganic tetrafunctional units in which the four valences of silicon are bonded to oxygen ($SiO_{4/2}$), and (2) the monofunctional trimethylsiloxy units, $(CH_3)_3SiO_{1/2}$. Polymers of this type in which the $SiO_{4/2}$ : $(CH_3)_3SiO_{1/2}$ mole ratio is from 0.8:1 to 2.0:1 are described as effective stabilizers of flexible polyether urethane foams in Belgian Pat. No. 720,212 and corresponding Canadian Pat. No. 860,995. On the other hand, copolymers composed of the aforesaid $SiO_{4/2}$ and $(CH_3)_3SiO_{1/2}$ units are ineffective stabilizers of flexible polyester foam.

Also reported in the prior art (U.S. Pat. No. 3,511,788) are polymers containing the aforesaid inorganic tetrafunctional units in combination with $(CH_3)_3SiO_{1/2}$ units either as the sole type of monofunctional unit or in further combination with a second type of monofunctional unit in which the silicon atom is bonded to two methyl groups and a hydroxyl-terminated poly(oxyalkylene) chain which is linked to the silicon atom by a divalent trimethylene group. In the polymers of U.S. Pat. No. 3,511,788, the proportion of tetra- to total mono-functional units ranges from 1:0.6 to 1:1.2. Although the polymers of the aforesaid patent are reported therein as useful frothing agents in the manufacture of polyvinyl chloride plastisol foams and foaming agents for simple organic solvents, they are ineffective stabilizers of flexible polyester foam.

An additional factor which further complicates this area of technology is the need to minimize and ultimately overcome the major drawback of urethane foams which is their ability to ignite readily and burn. In view of the fact that urethane foams are used in applications where fire creates a hazard, a great deal of effort has been and is being expended to reduce their flammability. Here too, however, specific types of foams have selective requirements. Flame-retardancy is particularly difficult in the area of flexible foam manufacture in view of the delicate open cell nature of flexible foams as compared with the more highly cross-linked and closed-cell rigid foams. The problem is compounded by the desirability of achieving fire-retardant properties without substantial sacrifice of foam quality required for a particular end-use application.

It is an object of this invention to provide new and useful organosilicone polymers which have particular application in the manufacture of cellular polyester-based polyurethanes.

Another object is to provide particular organosilicone polymers containing inorganic, tetrafunctional silicon-containing units as one type of monomeric unit, which polymers are effective stabilizers of flexible polyester-based urethane foam including flame-retarded foam, and a method for the preparation of said polymers.

A further object is to provide particular flexible polyester-based urethane cellular products of reduced flammability, and a process for the manufacture thereof.

Various other objects and advantages of this invention will become apparent to those skilled in the art from the accompanying description and disclosure.

SUMMARY OF THE INVENTION

In accordance with one aspect of the teachings of this invention, organosilicone polymers are provided which contain as essentially the sole types of monomeric units: (A) inorganic tetrafunctional silicon-containing units in which the four valences of the respective silicon atoms are satisfied by bonds to oxygen, (B) monofunctional polyether-substituted siloxy units in which silicon is bonded to at least one organic moiety bearing an organic-capped poly(oxyalkylene) chain, and (C) monofunctional trihydrocarbylsiloxy units, and in which the mole ratio of said tetrafunctional to said monofunctional polyether-substituted units is from about 0.75:1 to about 2:1 and the mole ratio of said monofunctional trihydrocarbyl to said monofunctional polyether-substituted units is from about 0.1:1 to about 1:1.

For convenience, the aforesaid units of the polymers of this invention are referred to herein generally as the A, B and C units, respectively.

In accordance with a second aspect of the present invention, a process for producing flexible polyester-based polyurethane foam is provided which comprises reacting and foaming a reaction mixture of: (1) a polyester polyol reactant containing an average of at least two hydroxyl groups per molecule; (2) a polyisocyanate reactant containing at least two isocyanato groups per molecule; (3) a blowing agent; (4) a catalyst comprising an amine; and (5) the organosilicone polymers of this invention comprising the aforesaid tetrafunctional, polyether-substituted monofunctional and trihydrocarbyl-substituted monofunctional silicon-containing units A, B and C, respectively. In addition to their efficacy as stabilizers of polyesterbased urethane foams, the organosilicone polymers of this invention possess the further advantageous property of allowing for the formation of flame-retarded foams of acceptable overall quality. In accordance with this aspect of the present invention, flame-retarded flexible polyester-based urethane foams are provided by reacting and foaming reaction mixtures which also include a silicon-free, flame-retarding agent.

In providing either non flame-retarded or flame-retarded foams, the organosilicone polymers described herein can be introduced to the foam-producing reaction mixtures either as such, as a blend with various organic additives, or as a component of an aqueous premixture which also comprises the catalyst for the polyester polyol/polyisocyanate reaction.

The present invention also relates to methods for the preparation of the novel organosilicone polymers described herein, particular solution compositions thereof, and to the foams which are made therewith.

DESCRIPTION OF THE PREFERRED EMBODIMENTS

The functionality of the respective types of structural units (A, B and C) of the polymers of this invention defines the number of oxygen atoms to which the silicon atom (Si) of any particular unit is bonded. Since each oxygen atom is shared by a silicon atom (Si') of another unit, functionality also denotes the number of linkages by which the particular unit can be bonded to another portion of the polymer through -Si-O-Si'-bonds. Accordingly, in expressing the structural and empirical formulas of the respective units of the polymers of this invention, fractional subscripts are used in which the value of the numerator defines functionality (i.e., the number of oxygen atoms associated with the silicon atom of the particular unit), and the denominator, which in each instance is 2, denotes that each oxygen atom is shared with another silicon atom.

Thus, in the inorganic tetrafunctional units (A) of the polymers of this invention, each of the four valences of silicon is associated with oxygen as shown by the structure,

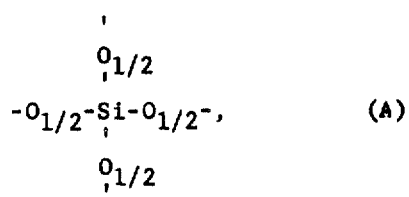

and expressed by the empirical formula, $SiO_{4/2}$, which in abbreviated form is often expressed simply as $SiO_2$.

In monofunctional structural units B of the polymers of this invention, one valence of the tetravalent silicon atom is associated with oxygen and at least one valence is satisfied by a bond to a carbon atom of an organic moiety bearing an organic-capped poly(oxyalkylene) chain. For the sake of brevity, the said organic-capped poly(oxyalkylene) chain-bearing organic moiety is also referred to herein as the "polyether group" and is designated herein by the sysmbol "E." The remaining valences of silicon of the B units are satisfied by bonds to respective carbon atoms of either two additional polyether groups (E) or two monovalent hydrocarbon radicals, designated herein by the symbol "R," or a combination of the E and R groups. Consistent with this definition, the polyether-substituted monofunctional siloxy units (B) of the polymers of this invention have the following general structural formula:

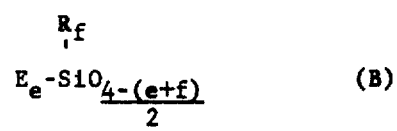

wherein E is the aforesaid organic-capped (poly)oxyalkylene) chain-bearing organic moiety (i.e., a polyether group), R is a monovalent hydrocarbon radical, $e$ is an integer having a value of from 1 to 3, $f$ has a value of from 0 to 2, and the sum $e+f$ is 3.

It is to be understood that the organosilicone polymers of this invention may contain any one of the three types of monofunctional structures encompassed by Formula B [that is, $(E)(R)_2SiO_{1/2}$, $(E)_2(R)SiO_{1/2}$ or $E_3SiO_{1/2}$] as essentially the sole type of B units, or the polymers may contain any combination thereof such as, for example, a combination of $(E)(R)_2SiO_{1/2}$ and $(E)_2(R)SiO_{1/2}$.

In the monofunctional trihydrocarbylsiloxy units (C) of the polymers of this invention, one valence of silicon is associated with oxygen and each of the remaining three valences is satisfied by a bond to a carbon atom of a monovalent hydrocarbon group, designated herein as $R°$, as shown by the general structural formula,

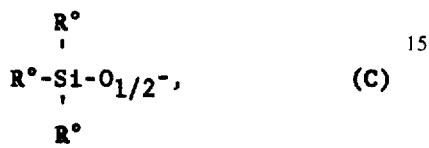   (C)

which has the empirical formula, $R°_3SiO_{1/2}$. Within any particular $R°_3SiO_{1/2}$— unit, or, as between different $R°_3SiO_{1/2}$— units, the $R°$ groups may be the same or different.

In view of their monofunctionality, the B and C units of the polymers of this invention cannot extend the polymer network since they are chain-terminating groups. This is in contrast to the reactivity of the polyether-substituted di- and tri-functional monomeric B units of the organosilicone polymers described and claimed in copending application Ser. No. 132,360 filed Apr. 8, 1971, of Bela Prokai and Bernard Kanner, now U.S. Pat. No. 3,793,360. In view of their polyfunctionality, the B units of the polymers of the aforesaid application are chain-extending or polymer-building monomeric units.

The essential polyether group (E) of the monofunctional siloxy units encompassed by Formula B above, are more specifically defined by the formula, $WO-(C_nH_{2n}O)_d-L-$, wherein $WO-(C_nH_{2n}O)_d-$ is an organic end-blocked poly(oxyalkylene) chain and —L— is a bivalent organic radical that links the poly(oxyalkylene) chain, $-(C_nH_{2n}O)_d-$, to silicon. When this more specific expression is used in Formula B above in place of E, the following more detailed definition of the monofunctional siloxy units (B) of the polymers of this invention is provided,

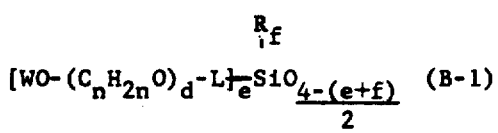   (B-1)

wherein, as above defined, e has a value of from 1 to 3, f has a value of from 0 to 2, the sum e+f is 3, and R is a monovalent hydrocarbon radical. In the poly(oxyalkylene) chain, $-(C_nH_{2n}O)_d-$, d is a number having an average value of from about 4 to about 30, and n can have a value of from 2 to 4 provided at least 75 weight per cent of the poly(oxyalkylene) chain is constituted of oxyethylene units, $-(C_2H_4O)-$. Usually, the average value of d is from about 5 to about 15, and the average value of n is from 2 to 2.25. The other oxyalkylene units with which the oxyethylene groups may be in combination are oxypropylene, $-(C_3H_6O)-$, and oxybutylene, $-(C_4H_8O)-$, units. When the oxyethylene units are present in combination with other oxyalkylene units, the units of different types can be randomly distributed throughout the poly(oxyalkylene) chain or they can be grouped in respective sub-blocks, provided the total average content of $-(C_2H_4O)-$ in the chain is at least 75 weight percent. Preferably, the total average poly(oxyethylene) content of the chain, $-(C_nH_{2n}O)_d-$, is from about 85 to about 100 weight percent.

The bivalent organic groups represented by —L— in the above Formula B-1 can be any of a variety of radicals having from 2 to 14 carbon atoms and are usually hydrocarbon groups. Illustrative are such groups as:

$$-R'-$$
$$-R''-$$
$$-R''-R''-$$
$$-R''-R'-R''-$$

and the like, wherein $R'$, in each instance, is a bivalent branched or straight chain alkylene radical having the formula, $-C_mH_{2m}-$, m being an integer having a preferred value of from 2 to 4, of which 3 is particularly preferred, and $R''$ in each instance is an arylene group having from 6 to 14 carbon atoms, including alkyl-substituted arylene groups. Typical examples of the linking groups (—L—) are: ethylene ($-CH_2CH_2-$); trimethylene ($-CH_2CH_2CH_2-$); propylene [$-CH_2CH(CH_3)-$]; tetramethylene; methylpropylene [$-CH_2CH(CH_3)CH_2-$]; ethylethylene [$-CH_2CH(C_2H_5)-$]; phenylene ($-C_6H_4-$); tolylene [$-(CH_3)_2C_6H_2-$]; biphenylene ($-C_6H_4-C_6H_4-$); $-C_6H_4-CH_2-C_6H_4-$; $-C_6H_4-C(CH_3)_2-C_6H_4$; and the like.

As is evident from the above-described classes of bivalent linking radicals (—L—), the unsatisfied valences thereof are associated with carbon and thus form a carbon-to-oxygen bond with the poly-oxyalkylene) chain and a carbon-to-silicon bond with the silicon atom of the respective siloxy units.

As further indicated by the above Formula B-1, the poly(oxyalkylene) chain, $-(C_nH_{2n}O)_d-$, is terminated by the organic group, WO—, wherein W is a monovalent organic capping group. Illustrative of the organic caps encompassed by W are such groups as:

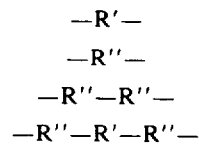

$R^\infty NHC(O)-$, and $R^\infty C(O)-$ wherein $R^\infty$, in each instance, is a monovalent hydrocarbon radical having from 1 to 12 carbon atoms, and is usually free of aliphatic unsaturation. The groups (WO—) which end-block the poly(oxyalkylene) chains are, therefore, corresponding $R^\infty O-$, $R^\infty NHC(O)O-$ and $R^\infty C(O)O-$ monovalent organic radicals. In the aforesaid capping (W) and terminal (WO—) groups, $R^\infty$ can be any of the following: an alkyl group including linear and branched chain alkyl groups having the formula, $C_yH_{2y+1}-$, wherein y is an integer of from 1 to 12, such as, for example, methyl, ethyl, n-propyl, isopropyl, n-butyl, t-butyl, octyl and dodecyl groups; a cycloaliphatic radical including monocyclic and bicyclic groups such as, for example, cyclopentyl, cyclohexyl and bicyclo[2.2.1]heptyl groups; an aromatically unsaturated group including aryl, alkaryl and aralkyl radicals such as, for example, phenyl, naphthyl, xylyl, tolyl, cumenyl, mesityl, t-butylphenyl, benzyl, beta-phenylethyl and 2-phenylpropyl groups; alkyl- and aryl-substituted cycloaliphatic radicals such as, for example, methylcyclopentyl and phenylcyclohexyl radicals; and the like. It is evident, therefore, that the terminal group (WO—) of the essential polyether group (E) of the monofunctional siloxy units (B) of the polymers of this invention, as well as the terminal groups of additional polyether groups (E) which may or may not be present, can be corresponding alkoxy, aryloxy, aralkoxy, alkaryloxy, cycloalkoxy, acyloxy, aryl—C(O)O—, alkyl carbamate and aryl carbamate groups.

The generally preferred $R^{oc}$ groups are phenyl, lower alkyl radicals, the lower alkyl-substituted aryl groups and the aryl-substituted lower alkyl groups, wherein the term "lower alkyl" denotes $C_1$-$C_4$ alkyl radicals. Therefore, illustrative of the preferred capping groups represented by W of the above Formula B-1 are: methyl, ethyl, propyl, butyl, phenyl, benzyl, phenylethyl ($C_6H_5$—$C_2H_4$—), acetyl, benzoyl, methylcarbamyl [$CH_3NHC(O)$—], ethylcarbamyl ([$C_2H_5NHC(O)$—], propyl- and butyl-carbamyl groups, phenylcarbamyl [$C_6H_5NHC(O)$—], tolylcarbamyl [($CH_3)_2C_6H_3NHC(O)$—], benzylcarbamyl [$C_6H_5CH_2NHC(O)$—], and the like.

It is to be understood that the terminal organic radical (WO—) of the respective polyether groups of the polymers of this invention may be the same throughout the polymer or may differ as between the B units. Likewise, the WO—, radical may also be the same or different within any particular unit containing more than one polyether group such as the $(E)_2(R)SiO_{1/2}$ and $(E)_3SiO_{1/2}$ units encompassed by Formula B-1 above. For example, the polymer compositions of this invention can contain polyether groups in which the terminal group (WO—) is benzyloxy ($C_6H_5CH_2O$—) and other polyether groups in which WO— is a hydrocarbylcarbamate group such as methylcarbamate, $CH_3NHC(O)O$—, or an acyloxy group such as acetoxy.

The preferred B units of the polymers of this invention are those in which one polyether group (E) is bonded to silicon and the remaining two valences of silicon are bonded to monovalent hydrocarbon groups, designated hereinabove as R. Thus, when in Formula B-1, $e$ is 1 and $f$ is 2, the B units have the preferred structure:

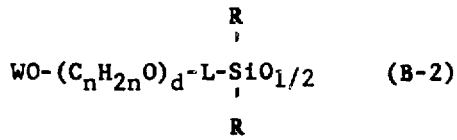

(B-2)

wherein W, —$(C_nH_{2n}O)_d$— and —L— are as defined with specific reference to Formula B-1. As also described above, monovalent hydrocarbon groups, designated as $R°$, are bonded to silicon of the monofunctional siloxy units (C) as defined by general formula C above. The monovalent hydrocarbon groups represented by R and $R°$ are free of aliphatic unsaturation and contain from 1 to 12 carbon atoms, and can be any of the following: an alkyl group including linear and branched chain alkyl groups encompassed by the formula, $C_yH_{2y+1}$—, wherein $y$ is an integer from 1 to 12; a cycloaliphatic radical including monocyclic and bicyclic groups; an aromatically unsaturated group including aryl, alkaryl and aralkyl radicals; and other combinations of the aforesaid groups such as alkyl- and aryl-substituted cycloaliphatic radicals; and the like.

Typical of the aforesaid respective classes of R and $R°$ are: methyl, ethyl, n-propyl, isopropyl, n-butyl, t-butyl, octyl and decyl groups; cyclopentyl, cyclohexyl and bicyclo[2.2.1]heptyl groups; phenyl and naphthyl groups; xylyl, tolyl, cumenyl, mesityl and t-butylphenyl groups; benzyl, beta-phenylethyl and 2-phenylpropyl groups, methylcyclopentyl and phenylcyclohexyl; and the like.

Of the alkyl groups represented by R and $R°$, the lower alkyl groups having from 1 to 4 carbon atoms are preferred of which methyl is especially suitable. It is to be understood that within any one of the monofunctional trihydrocarbylsiloxy C units, $R°_3SiO_{1/2}$, the $R°$ groups may be the same or different and that, as between such units, the $R°$ groups may also be the same or different. Similarly, as between the preferred monofunctional siloxy B units, $(E)(R)_2SiO_{1/2}$, of the polymers of this invention, the respective R groups may be the same or different and may or may not be the same as the $R°$ groups of the monofunctional C units. In the most preferred polymers of this invention, the polyether-substituted monofunctional siloxy units (B) are of the $(E)(R)_2SiO_{1/2}$ type, and essentially all of the R and $R°$ groups bonded to the silicon atoms are methyl groups.

The novel organosilicone polymers of this invention are depicted by the general expression,

(D)

in which the recurring monomeric units A are $SiO_{4/2}$, and the B and C units are as described above with specific reference to Formulas B and C. When these respective definitions of the A, B and C units are included in the above expression, the polymeric compositions of this invention are expressed as follows:

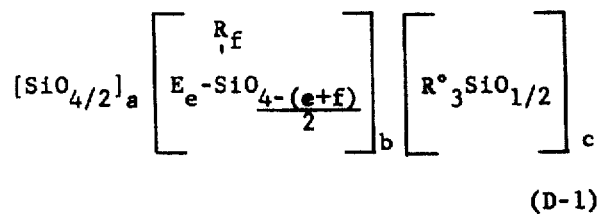

(D-1)

wherein: E represents a polyether group having the formula, WO—$(C_nH_{2n}O)_d$—L—, in which WO— is an organic terminal group of the poly(oxyalkylene) chain, —$(C_nH_{2n}O)_d$—, and —L— is a bivalent hydrocarbon radical that links the chain to silicon, as defined above with particular reference to Formula B-1; and, as also previously defined, R and $R°$ are monovalent hydrocarbon groups, $e$ has a value of from 1 to 3 and $f$ has a value of from 0 to 2, provided the sum $e+f$ is 3; and the relative proportions of monomeric units A, B and C, expressed on a mole basis, are defined by the relative values of $a$, $b$ and $c$, respectively. The polymers of this invention contain from about 0.75 to about 2 moles of A per mole of B, and from about 0.1 to about 1 mole of C per mole of B. Therefore, in the above expressions D and D-1, the ratio of $a:b$ is from about 0.75:1 to about 2:1, and the ratio of $c:b$ is from about 0.1:1 to about 1:1.

The polymers of this invention have a total polyether content of from about 50 to about 85 weight per cent and a corresponding total siloxane content of from about 50 to about 15 weight percent, the said polyether and siloxane contents being based on the combined total weight of the monomeric units A, B and C. As used herein, the expression "total polyether content" denotes the sum of the combined total weights of the polyether groups (E) that are bonded to silicon of the monofunctional siloxy units B. Accordingly, the expression "total siloxane content" denotes the sum of the combined total weights of: (1) the SiO$_{4/2}$ units, (2) the monofunctional B units less the total weight of the polyether groups (E), and (3) the monofunctional units C.

The organosilicone polymers of this invention can contain the tetrafunctional A units and monofunctional C units in combination with one or more of the various types of B units encompassed by the above Formula B, as illustrated by the following:

$$[SiO_{4/2}]_a [E-SiO_{1/2}]_b [R°_3SiO_{1/2}]_c \quad\quad D-2$$

$$[SiO_{4/2}]_a [E_2-SiO_{1/2}]_b [R°_3SiO_{1/2}]_c \quad\quad D-3$$

$$[SiO_{4/2}]_a [E_3-SiO_{1/2}]_b [R°_3SiO_{1/2}]_c \quad\quad D-4$$

$$[SiO_{4/2}]_a \left[ [E-SiO_{1/2}]_v [E_2-SiO_{1/2}]_w \right]_b [R°_3SiO_{1/2}]_c \quad\quad D-5$$

$$[SiO_{4/2}]_a \left[ [E-SiO_{1/2}]_v [E_3-SiO_{1/2}]_w \right]_b [R°_3SiO_{1/2}]_c \quad\quad D-6$$

$$[SiO_{4/2}]_a \left[ [E_2-SiO_{1/2}]_v [E_3SiO_{1/2}]_w \right]_b [R°_3SiO_{1/2}]_c \quad\quad D-7$$

$$[SiO_{4/2}]_a \left[ [E-SiO_{1/2}]_v [E_2SiO_{1/2}]_w [E_3-SiO_{1/2}]_x \right]_b [R°_3SiO_{1/2}]_c \quad D-8$$

wherein: E, R and R° have the aforesaid significance; $v$, $w$ and $x$ are positive numbers, the respective sums $v+w$ and $v+w+x$ being equal to $b$; the mole ratio of the SiO$_{4/2}$ units to total polyether-substituted siloxy units to total trihydrocarbylsiloxy units (that is, the mole ratio of the [A]:[B]:[C] units, respectively) is defined by $a:b:c$ in which latter ratio the values of $a$, $b$ and $c$ are as aforesaid (that is, $a$ is from about 0.75 to about 2, $b$ is 1, and $c$ is from about 0.1 to about 1); and the total polyether content is maintained within the aforesaid range of from about 50 to about 85 weight percent, based on the combined total weight of the monomeric units.

The polymers of this invention are generally useful as surfactants and include compositions which find particular application in the manufacture of polyester urethane foam, including flame-retarded foam. Of the novel polymeric surfactants described herein, a generally preferred class, particularly for use in the formation of flexible polyester urethane foam, are the polymers represented by the following expression:

$$[SiO_{4/2}]_a [WO-(C_nH_{2n}O)_d-C_mH_{2m}-SiO_{1/2}]_b$$

$$[R°_3SiO_{1/2}]_c \quad\quad D-9$$

wherein: W is as aforesaid; R and R° are lower alkyl radicals having 1 to 4 carbon atoms; the link between the organic-terminated poly(oxyalkylene) chain and silicon is provided by the bivalent alkylene radical, —C$_m$H$_{2m}$— ($m$ preferably being from 2 to 4); from 75 to about 100 weight percent of the poly(oxyalkylene) chain is constituted of oxyethylene units and from 25 to 0 weight per cent is constituted of oxypropylene units; $d$ has an average value of from about 5 to about 15; and the average value of the mole ratio $a:b:c$ is about 0.75–2:1:0.1–1, as aforesaid.

The most preferred class of organosilicone polymers of this invention for use as stabilizers of flexible polyester-based urethane foam are those depicted by the following expression:

$$[SiO_{4/2}]_a[R^{\circ\circ}O-(C_2H_4O)_d-C_mH_{2m}-\underset{\underset{CH_3}{|}}{\overset{\overset{CH_3}{|}}{Si}}O_{1/2}]_b[(CH_3)_3SiO_{1/2}]_c \quad D-10$$

wherein $d$, $m$ and $a:b:c$ are as defined with respect to D-9, and $R^\infty$ is phenyl, lower alkyl, lower alkaryl or aryl-substituted lower alkyl groups.

In the preparation of the organosilicone polymers of this invention, silicon-containing reactants, designated herein as reactants A', B' and C', are employed in which silicon is bonded directly to hydrolyzable groups the number of which corresponds to the number of oxygen atoms bonded to silicon of the respective monomeric units A, B and C. The hydrolyzable groups can be halogen or organic radicals bonded to silicon through an oxygen atom including any combination thereof. Illustrative of suitable reactants (A') from which the tetrafunctional monomeric units (A) are derived are those encompassed by the general formula:

$$X_pSi(OY)_q(OCOY)_r \quad (A')$$

wherein: X is halogen (usually chlorine or bromine); Y is a hydrocarbon radical such as alkyl, aryl and aralkyl, and the like; and $p$, $q$ and $r$ can each have a value of zero to 4, provided the sum $p+q+r$ is four. Typical examples of this reactant are silicon tetrachloride, lower alkyl orthosilicates having the formula, $Si(OY')_q$, wherein $q$ is 4, and the lower alkyl partial esters of silicon tetrachloride, $(Cl)_pSi(OCOY')_r$, wherein each of $p$ and $r$ has a value of from 1 to 3, provided $p+r$ is 4, and Y' in each instance is an alkyl group having from 1 to 4 carbon atoms. Tetraethoxysilane (also known as tetraethyl orthosilicate or simply as ethyl orthosilicate) is especially suitable as the A' reactant.

REactant B' which is the ultimate source of the polyether-substituted monofunctional B units contains one hydrolyzable group bonded to silicon, and encompasses compounds having the general formula:

$$E^{\circ}_e-\underset{\underset{f}{|}}{\overset{\overset{R_f}{|}}{Si}}-Z \quad (B')$$

wherein: R corresponds to the monovalent hydrocarbon group (R) of the polyether-substituted monofunctional B units encompassed by general Formula B above; E° is either hydrogen or the polyether group (E) of general Formula B above, having the more specific structure, $WO-(C_nH_{2n}O)_d-L-$, wherein the bivalent linking group (—L—) is preferably an alkylene group, $-C_mH_{2m}-$, as defined above with reference to Formula B-1; $e$ and $f$ also have the same significance as in the monofunctional B units (that is, $e$ is from 1 to 3, $f$ is from 0 to 2, and the sum $e+f$ is 3); and Z is one of the aforesaid hydrolyzable groups, X, —OY or —OCOY wherein X and Y are as defined with respect to reactant A'.

Illustrative of the various types of reactants encompassed by Formula B' are the following:

$$WO-(C_nH_{2n}O)_d-C_mH_{2m}-\underset{\underset{}{|}}{\overset{\overset{R_2}{|}}{Si}}-X \quad B'-1$$

$$WO-(C_nH_{2n}O)_d-C_mH_{2m}-\underset{\underset{}{|}}{\overset{\overset{R_2}{|}}{Si}}-OY \quad B'-2$$

$$WO-(C_nH_{2n}O)_d-C_mH_{2m}-\underset{\underset{}{|}}{\overset{\overset{R_2}{|}}{Si}}-\overset{\overset{O}{\|}}{O}CY \quad B'-3$$

$$[WO-(C_nH_{2n}O)_d-C_mH_{2m}-]_2\underset{\underset{}{|}}{\overset{\overset{R}{|}}{Si}}X \quad B'-4$$

$$[WO-(C_nH_{2n}O)_d-C_mH_{2m}]_3SiX \quad B'-5$$

$$H-\underset{\underset{}{|}}{\overset{\overset{R_2}{|}}{Si}}X \quad B'-6$$

$$H_2\underset{\underset{}{|}}{\overset{\overset{R}{|}}{Si}}X \quad B'-7$$

$$H_3SiX \quad B'-8$$

wherein: R and the preferred organic-capped polyether group, $WO-(C_nH_{2n}O)_d-C_mH_{2m}-$, are as above-defined with specific reference to Formula B-1; X is halogen (usually chlorine); and Y is usually a lower alkyl group (Y') such as methyl or ethyl. In the preparation of organosilicone polymers of this invention in which a combination of different polyether-substituted units B are present, such as the $(E)(R)_2SiO_{1/2}$ and $(E)_2(R)-SiO_{1/2}$ units, more than one B' reactant is required. For example, in preparing the polymers illustrated above by expression D-5, the respective polyether-substituted monofunctional siloxy units are obtained by employing a combination of corresponding B' reactants such as the aforesaid B'-1 and B'-4. Alternatively, such polymers are provided by employing a combination of hydrosilanes such as reactants B'-6 and B'-7, as the source of the siloxane portions of the respective B units, and the silicon-bonded hydrogen is subsequently replaced by the polyether groups (E), as described hereinbelow. It is to be understood that a combination of polyether-substituted and hydrogensubstituted reactants such as B'-1 and B'-7 can also be employed without departing from the scope of this invention.

Reactant C' which is the source of the monofunctional trihydrocarbylsiloxy units (C) of the polymers of this invention, also contains one hydrolyzable group and is represented by the following general formula:

$$R^{\circ}-\underset{\underset{R^{\circ}}{|}}{\overset{\overset{R^{\circ}}{|}}{Si}}-Z \quad (C')$$

wherein: R° corresponds to the monovalent hydrocarbon group (R°) of the monofunctional C units encompassed by Formula C above; Z can be any of the aforesaid hydrolyzable groups, designated as X, —OY and —OC(O)Y, and can additionally be a hydroxyl group, or an —OSiR°₃ group in which event the C' reactant is a disiloxane.

Illustrative of the various types of reactants encompassed by Formula C', which may be used alone or in combination, are the following:

| | |
|---|---|
| $R°_3SiX$ | C'-1 |
| $R°_3SiOH$ | C'-2 |
| $R°_3Si-OY$ | C'-3 |
| $R°_3Si-OC(O)Y$ | C'-4 |
| $R°_3SiOSiR°_3$ | C'-5 | wherein: R° is as defined hereinabove; X is halogen (usually chlorine); and Y is usually a lower alkyl group (Y') such as methyl or ethyl.

THe organosilicone polymers of this invention are produced by the process which comprises cohydrolyzing the above-described reactants A', B' and C' and co-condensing the hydrolyzate, thereby providing either the polymer compositions of the invention as the direct product of the cohydrolysis-cocondensation reaction, or an intermediate polysiloxane polymer product containing silicon-bonded hydrogen which is reacted further to substitute silanic hydrogen with polyether groups. Reactants A', B' and C' are employed in respective amounts selected to provide the corresponding monomeric A, B and C units in the relative molar proportions defined above as the $a:b:c$ ratio in which ratio the values of $a$ and $c$ are from about 0.75 to about 2 and from about 0.1 to about 1, respectively, expressed on the normalized basis of $b=1$. Accordingly, in producing the polymers of this inventioh, from about 0.75 to about 2 moles of reactant A' are employed per mole of reactant B' and from about 0.1 to about 1 mole of reactant C' are employed per mole of B'. Water is preferably used in an amount at least sufficiently to satisfy the stoichiometry of the cohydrolysis reaction. Usually, water is used in a 10 to 200 percent molar excess of the stoichiometric requirements, although more than a 200 percent molar excess can be employed without departing from the scope of this embodiment of the present invention.

The cohydrolysis-cocondensation reaction for producing the novel polymers described herein is illustrated by the following equation (1) wherein for convenience, tetraethoxysilane is shown as reactant A', and chlorine is shown as the respective hydrolyzable groups of reactants B' and C':

wherein, as above-defined, E° is either hydrogen or a polyether group (E); R and R° are monovalent hydrocarbon groups; $e$ is from 1 to 3 and $f$ is from 0 to 2. provided $e+f$ is 3; $a'$, $b'$ and $c'$ which represent the number of moles of the indicated A', B' and C' reactants, can be any positive numbers provided the ratio thereof, that is, $a':b':c'$, when expressed on the normalized basis of $b'=1$, is about 0.75-2:1:0.1-1, thereby providing polymers in which the respective monomeric units A, B and C are present in corresponding molar proportions, the $a:b:c$ ratio, when expressed on the normalized basis of $b=1$, also being about 0.75-2:1:0.1-1. Provided the ratio of the number of moles of reactants employed is as specified, the actual number of moles employed (and thus the quantity of polymer produced) can be any multiple of the $a':b':c'$ ratio, depending upon the scale on which it is desired to carry out the reaction.

When the B' reactant employed in the cohydrolysis-cocondensation reaction of equation (1) is a hydrosilane (such as, for example, reactants B'-6 to B'-8 above), the product is reacted further with a monoolefinic poly(oxyalkylene) ether having the formula, $WO-(C_nH_{2n}O)_d-C_mH_{2m-1}$. In the ether reactant, the moiety, $WO-(C_nH_{2n}O)_d-$, is as above-defined with respect to the corresponding organic terminated poly(oxyalkylene) chain of the polyether-substituted siloxy units (B), and $-C_mH_{2m-1}$ is a monovalent olefinic group wherein $m$ has the same significance as in the bivalent alkylene group ($-C_mH_{2m}-$) of the polyether substituents (E) of monomeric units B (that is, $m$ has a value of from 2 to 14, and is usually from 2 to 4). This embodiment of the method for producing the novel polymers of the present invention is illustrated by the reactions of the following equations (2) and (3) wherein tetraethoxysilane and a trihydrocarbylmonochlorosilane typically illustrate the A' and C' reactants, respectively, the B' reactant is shown as a dihydrocarbylmonochlorohydrosilane, and, for the purpose of illustration, the A', B' and C' reactants are used in equimolar proportions:

Equation 1:

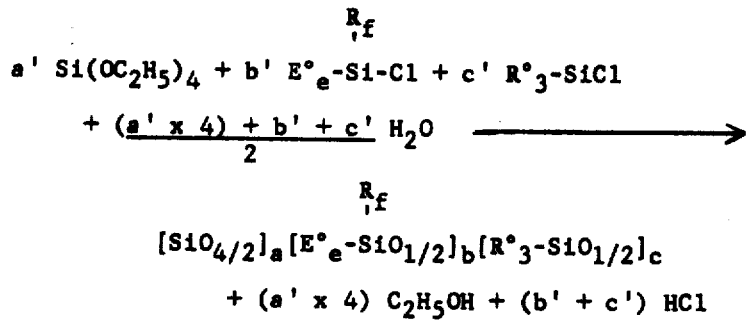

$$a' \text{ Si}(OC_2H_5)_4 + b' \text{ E}°_e\text{-Si-Cl} + c' \text{ R}°_3\text{-SiCl}$$

with $R_f$ on the Si of the B' term, and $$+ \frac{(a' \times 4) + b' + c'}{2} H_2O \longrightarrow$$

$$[SiO_{4/2}]_a [E°_e\text{-SiO}_{1/2}]_b [R°_3\text{-SiO}_{1/2}]_c$$

with $R_f$ on the Si of the B term, $$+ (a' \times 4) C_2H_5OH + (b' + c') HCl$$

Equation 2:

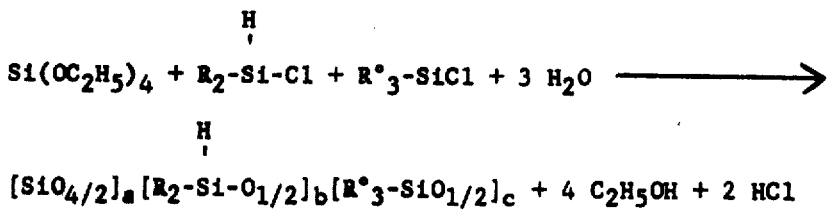

$$Si(OC_2H_5)_4 + R_2\text{-Si-Cl} + R°_3\text{-SiCl} + 3 H_2O \longrightarrow$$

with H above and below the Si of the second term, $$[SiO_{4/2}]_a [R_2\text{-Si-O}_{1/2}]_b [R°_3\text{-SiO}_{1/2}]_c + 4 C_2H_5OH + 2 HCl$$

Equation 3:

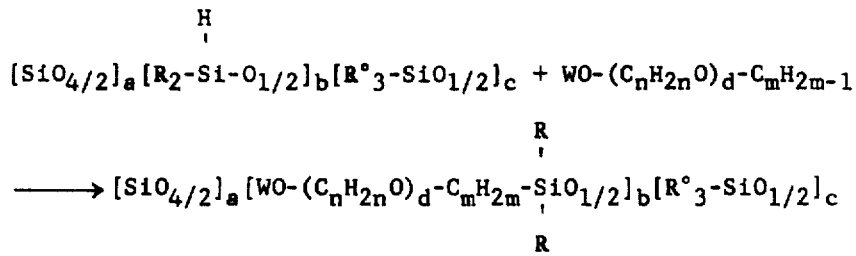

Since the reaction of equation (2) is illustrated on the basis of equimolar amounts of reactants A', B' and C', the mole ratio of $a:b:c$ in equations (2) and (3) is, of course, 1:1:1. When reactant B' contains more than one silicon-bonded hydrogen atom as in reactant B'-7 above, for example, the intermediate product of the reaction of equation (2), is reacted with at least a corresponding number of moles of the monoolefinic polyether reactant to satisfy stoichiometric requirements.

In accordance with another embodiment of the process for preparing the novel organosilicone polymers of this invention, the B' reactant is one in which E° of the above Formula B' is a polyether group (E) rather than hydrogen, and the polymers are produced as the direct product of the cohydrolysis-cocondensation reaction. This embodiment is illustrated by the reaction of the following equation (4) wherein tetraethoxysilane typically illustrates the A' reactant, B' is shown as a mono(polyether)-substituted dihydrocarbylmonochlorosilane, C' is illustrated as a trihydrocarbylmonochlorosilane, and reactants A', B' and C' are employed in equimolar amounts:

Equation 4:

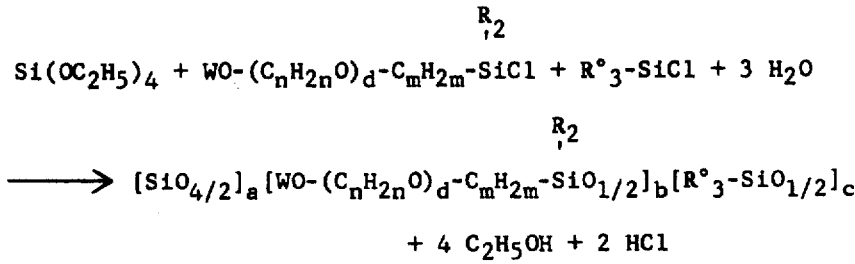

wherein R, R°, W, $n$, $d$ and $m$ are as previously defined herein and the mole ratio ($a:b:c$) of the respective silicon-containing units is about 1:1:1.

Reactants B' encompassed by Formula B' above in which from one to three polyether groups (E) are bonded to silicon, are in turn prepared by reacting the aforesaid monoolefinic poly(oxyalkylene) ethers, $WO-(C_nH_{2n}O)_d-C_mH_{2m-1}$, with hydrosilanes in which the number of silicon-bonded hydrogen atoms corresponds to the number of polyether groups desired in the monomeric B units. For example, the B' reactant shown in equation (4) above which is of the $(E)(R)_2SiCl$ type as well as the B' reactants of the $(E)_2(R)SiCl$ and $(E)_3SiCl$ types, are prepared as illustrated by equations (5)–(7) below.

Equation 5:

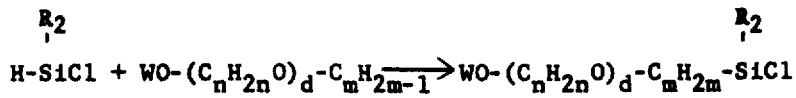

Equation 6:

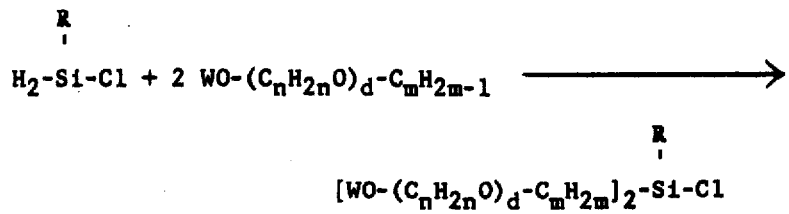

Equation 7:

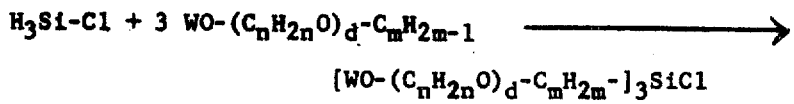

$$H_3Si\text{-}Cl + 3 \text{ WO-}(C_nH_{2n}O)_d\text{-}C_mH_{2m-1} \longrightarrow [\text{WO-}(C_nH_{2n}O)_d\text{-}C_mH_{2m}\text{-}]_3SiCl$$

wherein: R, W, $n$, $d$ and $m$ have the previously defined significance, and the monoolefinic group, $-C_mH_{2m-1}$, is preferably vinyl, allyl or methallyl, the allyl group being especially suitable. The monoolefinic polyether reactants used in the reactions of equations (3) and (5)-(7) above, can be prepared by starting alkylene oxide polymerization with a monoolefinic alcohol such as allyl alcohol to provide $HO-(C_nH_{2n}O)_d-C_mH_{2m-1}$ (wherein $n$ and $d$ are as previously defined herein and $m$ has a value of at least 3), followed by capping of the terminal hydroxyl group with the aforesaid organic radical, W—, such as methyl, phenyl, benzyl, acetyl, methylcarbamyl and like capping groups. Further details concerning the method of preparation of such polyether reactants are described in British patent specification Nos. 1,220,471 and 1,220,472. Alternatively, the polyether reactants can be prepared by starting the alkylene oxide polymerization with an alkanol such as methanol, an aralkyl alcohol such as benzyl alcohol, a phenol and the like, followed by capping of the terminal hydroxyl group of the reaction product with the monoolefinic group such as vinyl, allyl, methallyl and the like. Of these various polyether reactants, allyl alcohol-started poly(oxyalkylene) ethers are especially suitable.

The addition of the silanic hydrogen of the respective hydride reactants of equations (5)-(7), as well as the addition of silicon-bonded hydrogen of the intermediate polymer product shown in equation (3), to the monoolefinic group, $-C_mH_{2m-1}$ (e.g., $-CH_2-CH=CH_2$) of the polyether reactant, are platinum-catalyzed reactions. Usually, platinum is used in the form of chloroplatinic acid in a catalytic amount such as from 5 to 150 parts per million parts by weight, based on the combined weight of the silicon-containing and polyether reactants. Suitable reaction temperatures range from about room temperature (25°C.) to about 150°C. If desired, the hydrosilation reactions may be conducted in the presence of liquid aromatic hydrocarbons such as toluene and xylene, although other non reactive solvents can also be used.

When the organic radical (W—) of the terminal group (WO—) of the poly(oxyalkylene) chain of the polyether-substituted monofunctional units (B) is a monovalent hydrocarbon group (that is, the above-defined $R^\infty$- group such as methyl, phenyl and benzyl groups, the polymers are preferably prepared in accordance with the method illustrated by the reaction of equation (4) above, in which the B' reactant already contains the polyether group (E) and the polymer is the direct product of the cohydrolysis-cocondensation reaction. When the organic cap (W—) of the polyether group of the B units is an acyl ($R^\infty CO-$) or carbamyl ($R^\infty NHCO-$) group, it is usually preferred to prepare the polymers of this invention in accordance with the reactions of equations (2) and (3) whereby, as shown, the polyether groups (E) are introduced in a step subsequent to the cohydrolysis-cocondensation reaction.

The above-described cohydrolysis-cocondensation reactions for producing the organosilicone polymers of this invention can be carried out at temperatures from about 25°C. to about 150°C., in the presence or absence of a solvent or diluent. The presence of solvents may aid by increasing compatibility between reactants, effecting distribution, and thereby avoiding gel formation and controlling reaction rates. Useful solvents are aromatic hydrocarbons (such as, for example, toluene and xylene), mixtures of aromatic hydrocarbons, low molecular weight alcohols (such as, for example, isopropanol), ethers including low molecular weight polyethers in which hydroxyl groups initially terminating the chains have been capped with an organic group (such as, for example, methyl) and other solvents which are non reactive with silicon-bonded functional groups (such as Si—H, Si—Cl and Si—OY) of the A', B' and C' reactants.

The by-products of the cohydrolysis-cocondensation reaction depend, of course, on the nature of the hydrolyzable groups of the A', B' and C' reactants, and are readily removed from the polymeric product, usually by fractional distillation. For example, the ethanol and hydrochloric acid formed as by-products of the illustrative reactions of equations (1), (2) and (4) above, are readily removed, together with excess water, as a $C_2H_5OH-HCl-H_2O$ azetrope. As desired, any organic solvent used in the polymer preparation is also removed by conventional separation techniques to obtain a substantially 100 percent active polymer composition. After removal of by-products and water, a substantially neutral product of the cohydrolysis-cocondensation reaction is provided. Although neutralization is usually not necessary, sodium bicarbonate may be added and the polymer product filtered to remove platinum residues introduced during the platinum-catalyzed hydrosilation reactions illustrated by equations (3) and (5)-(7) above.

In addition to the A, B and C units, the polymers of this invention may contain residual silanols and residual hydrolyzable groups remaining from the reactants employed in the preparation thereof. In addition, a small percentage (on the average, usually about 10 mole percent or less) of the total polyether groups (E) may be residual, uncapped hydroxyl-terminated groups [that is, $HO-(C_nH_{2n}O)_d-C_mH_{2m}-$], introduced with the monoolefinic poly(oxyalkylene) ether reactants employed in the reaction of equation (3) above, or in the preparation of B' reactants as illustrated by the above equations (5)-(7). In the use of the polymers of this invention as stabilizers of polyester foam, the combined weight of the aforesaid residual groups should be no higher than about 10 percent, and is preferably less than 6 weight percent, based on the total weight of the polymer.

The content of such residual groups is substantially reduced and minimized by treatment of the polymeric products with an organic isocyanate in the presence of an amine catalyst such as those described hereinbelow as suitable for the urethane-forming reaction (for example, triethylamine and N-ethylmorpholine), or a metal catalyst such an organo-tin compounds (for example, stannous octoate, dibutyl tin dilaurate, and the like). Usually, the organic isocyanate employed in this treatment is an alkyl, aryl or aralkyl mono-isocyanate, such as, for example, methyl, ethyl, phenyl and benzyl isocyanates. The treatment of the polymer product in this manner may be carried out in the presence or absence of a solvent or diluent. Aromatic hydrocarbons such as xylene and toluene are suitable as the solvent medium.

The polymers of this invention are normally liquid materials and have molecular weights which vary over a relatively wide range. Generally, the average molecular weights of the polymers of this invention range from about 1,000 to about 10,000 (as measured by Gel Permeation Chromatography using a calibration curve based on dimethylsiloxane fluids). The organosilicone polymers of this invention are mixtures of polymer species which differ in molecular weight, polyether and siloxane contents, and relative molar proportions of the monomeric units. It is to be understood, therefore, that as expressed herein, the values of these parameters are average values.

The organosilicone polymers of this invention are effective as stabilizers of flexible polyester urethane foams and can, therefore, be used as such without the need for combination with an anionic or cationic organic surfactant, or other type of organic additive. The polymers can be employed as a substantially 100 percent active stream, or they can be employed in dilute form as a solution in polar solvents (e.g., glycols) or non polar organic solvents such as normally liquid aliphatic and aromatic unsubstituted and halogen-substituted hydrocarbons (e.g., heptane, xylene, toluene, chlorobenzenes and the like). In addition to the polymers, the other essential types of components and reactants employed in the production of flexible polyester urethane foam in accordance with the process of this invention are polyester polyols, organic polyisocyanates, amine catalyst and blowing agent. When producing self-extinguishing foams, the foam-producing reaction mixture also contains a flame-retardant. The organosilicone polymers of this invention are usually present in the final foam-producing reaction mixture in amounts of from about 0.15 to about 4.0 parts by weight per 100 parts by weight of the polyester polyol reactant.

It is often the preferred practice of foam manufacturers to premix the foam stabilizer, amine catalyst and water (which is the usual source of at least part of the blowing action), and to feed the aqueous premixture to the foam-producing reaction mixture as a single stream. The mere mixing of the organosilicone polymers of this invention with the catalyst and water, however, forms a heterogeneous mixture which detracts from the processing advantage of adding these components as a combined stream rather than as individual streams. The problem of premix incompatibility is overcome in accordance with the present invention by providing homogeneous aqueous premixtures comprising the organosilicone polymer, amine catalyst, an organic acidic component and, as an additional ingredient, either a water soluble organic surfactant or a water soluble glycol, or both of the latter two types of components. Although these various organic additives can be introduced directly to the aqueous premixture of foam stabilizer and catalyst, the formation of clear, homogeneous aqueous solutions is facilitated by blending the additives with the foam stabilizer (that is, the organosilicone polymers of this invention) and combining the resulting blend with water and the amine catalyst system. In accordance with another embodiment of this invention, therefore, solution compositions are provided comprising the organosilicone polymers of this invention, the aforesaid organic acidic component, and one or both of an organic surfactant and glycol. The organosilicone polymer is present in the solution compositions in an amount of from about 10 to about 80 parts by weight per 100 parts by weight of the solution.

The aforesaid organic acidic component comprises the saturated and unsaturated aliphatic and cycloaliphatic carboxylic acids containing from 15 to 20 carbon atoms. Illustrative of suitable acidic components are the fatty acids such as, for example, palmitic, stearic, oleic, linoleic, linolenic and ricinoleic acids; resin acids of the abietic and pimaric type; and any combination of the aforesaid acids as well as industrial by-products and naturally occurring materials comprising such acids. An especially suitable acidic component of the solution compositions and aqueous premixtures of this invention is tall oil which is a by-product of sulfate digestion of wood pulp and is composed largely of fatty acids (oleic, linoleic, linolenic and palmitic acids) and resin acids, and a minor amount of neutral material such as fatty acid esters.

The above-described organic acidic component is present in the solution compositions of this invention in an amount of from about 5 to about 90 parts by weight per 100 parts by weight of organosilicone polymer present in the solution.

The water-soluble organic surfactant which can be a component of the solution compositions of this invention may be of the non ionic, anionic, cationic or amphoteric types, including combinations thereof. Preferably, the organic surfactant is a non ionic surfactant such as: the poly(oxyalkylene) ethers of the higher alcohols having from 10 to 18 carbon atoms including mixtures thereof; polyoxyalkylene ethers of alkyl-substituted phenols in which the alkyl group can have from 6 to 15 carbon atoms; and corresponding polythioalkylene adducts of the aforesaid higher alcohols and phenols. The length of the ether chain is such that appropriate hydrophilic character is provided to balance the hydrophobic portion derived from the alcohol or phenol and render the compound soluble in water. The chain may contain oxyethylene units either as essentially the sole type of unit or oxyethylene in combination with a minor amount of oxypropylene. It is preferred that the hydrophilic portion of the non ionic surfactants be composed essentially of oxyethylene monomeric units. Usually the average number of such —OC$_2$H$_4$-units ranges from about 4 to about 20, although upwards of 40 such units can also be present.

Typical examples of non ionic surfactants which can be used as components of the solution compositions of this invention are the adducts produced by reaction of $k$ moles of ethylene oxide (wherein $k$ has a value of from about 4 to about 40, inclusive of whole and fractional numbers) per mole of any of the following hydrophobes including mixtures thereof: n-undecyl alcohol, myristyl alcohol, lauryl alcohol, trimethyl nonanol, tridecyl alcohol, pentadecyl alcohol, cetyl alcohol, oleyl alcohol, stearyl alcohol, nonylphenol, dodecylphenol, tetradecylphenol, and the like.

Other illustrative water-soluble organic surfactants which can be present as a component of the solution compositions of this invention are: sodium, potassium, ammonium and quaternary ammonium salts of sulfonic acids wherein the hydrocarbyl portion can be alkyl or alkaryl groups containing from 10 to 20 carbon atoms. Examples of such organic surfactants are: sodium tetradecyl sulfonate and sodium dodecylbenzene sulfonate; sodium and potassium salts of sulfonated petroleum fractions such as mineral oil; diethylamine salts of sulfonated $C_{10}$–$C_{15}$ alkylated aromatic hydrocarbons; taurine compounds having at least one long chain hydrocarbyl group bonded to nitrogen; and the like.

The solution compositions of this invention may also contain, as a third type of organic component, a glycol of from 2 to about 10 carbon atoms such as, in particular, hexylene glycol (2-methyl-2,4-pentanediol), or low molecular weight Carbowax polyethylene glycols.

When both the organic surfactant and glycol components are present in the solution compositions of this invention, the combined concentration thereof ranges from about 5 to about 90 parts by weight per 100 parts by weight of the organosilicone polymer contained therein. When only one of these components is present, the concentration thereof is also within this latter range.

When the aforesaid solution compositions of the organosilicone polymers of this invention are combined with water and amine catalyst such as the catalysts described hereinbelow, clear, homogeneous aqueous solutions are obtained which can be added directly to the foam-producing reaction mixture. From the standpoint of retaining these desirable characteristics of clarity and homogeneity under otherwise adverse ambient temperatures which may be encountered upon standing, storage or shipment prior to use in the foam-producing reaction, the preferred aqueous premixtures are those containing both the organic surfactant (of which non ionics are preferred) and the glycol, in addition to the organic acidic component. It is to be understood that the aforesaid solution compositions of the organosilicone polymers of this invention are also useful when added directly to the final foamproducing reaction mixture rather than being premixed with water and amine catalyst.

The solution compositions of the foam stabilizer as well as the aqueous premixtures of this invention, can contain minor amounts of other ingredients without departing from the scope of this invention. Such components include inhibitors such as for example, d-tartaric acid, tertiary-butyl pyrocatechol and di-tert-butyl-p-cresol ("Ionol"), which reduce any tendency of the foamed product to oxidative or hydrolytic instability. Further, when the foam stabilizers of this invention and/or the amine catalyst are employed as respective solutions, water soluble carrier solvents and components thereof are, of course, introduced into the aqueous premixtures without, however, any deleterious affect on the effectiveness or homogeneity of the aqueous solution premixtures.

THe relative proportions of the organosilicone foam stabilizer of this invention, the amine catalyst and water in any particular solution are largely dependent upon and determined by the relative proportions of such ingredients which are desired in a particular foam-producing reaction mixture. Accordingly, in the preparation of a particular aqueous premixture of this invention, the relative proportions of the foam stabilizer, amine catalyst and water are adjusted and the aqueous premixture is added to the final foam-producing formulation in an amount sufficient to satisfy the respective functions of such components and to provide a foamed product of desired quality.

The polyester polyols employed in producing flexible foams in accordance with the process of this invention are the reaction products of polyfunctional organic carboxylic acids and polyhydric alcohols. The polyester polyols contain at least two hydroxyl groups per molecule (as alcoholic OH or as OH in COOH groups). The functionality of these acids is preferably provided by carboxy groups (COOH) or by both carboxy groups and alcoholic hydroxyl groups. The polyesters can have hydroxyl numbers from 30 to 150, and preferably have hydroxyl numbers from 45 to 65. These hydroxyl numbers are readily determined according to the procedure described by Mitchel et al., ORGANIC ANALYSIS, Volume I (Interscience, New York 1953.

Typical of the polyfunctional organic carboxylic acids that can be employed in producing polyester polyols useful in this invention are: dicarboxylic aliphatic acids such as succinic, adipic, sebacic, azelaic, glutaric, pimelic, malonic and suberic acids; and dicarboxylic aromatic acids such as phthalic acid, terephthalic acid, isophthalic acid and the like. Other polycarboxylic acids that can be employed are the "dimer acids" such as the dimer of linoleic acid. Hydroxyl-containing monocarboxylic acids (such as ricinoleic acid) can also be used. Alternatively, the anhydrides of any of these various acids can be employed in producing the polyester polyols.

The polyhydric alcohols (organic polyols) that can be employed in producing the polyester polyol starting material used in the process of this invention include the monomeric polyhydric alcohols such as, for example: glycerol; 1,2,6-hexanetriol; ethylene glycol; diethylene glycol; trimethylolpropane; trimethyolethane; pentaerythritol; propylene glycol; 1,2-, 1,3- and 1,4-butylene glycols; 1,5-pentanediol, sorbitol; and the like, including mixtures thereof.

Other polyhydric alcohols that can be employed in producing the polyester polyols useful in this invention are the polymeric polyhydric alcohols which include the linear and branched chain polyethers having a plurality of acyclic ether oxygens and at least two alcoholic hydroxyl radicals. Illustrative of such polyether polyols are the poly(oxyalkylene) polyols containing one or more chains of connected oxyalkylene radicals which are prepared by the reaction of one or more alkylene oxides with acyclic and alicyclic polyols. Examples of the poly(oxyalkylene) polyols include the poly(oxyethylene) glycols prepared by the addition of ethylene oxide to water, ethylene glycol or diethylene glycol; poly(oxypropylene) glycols prepared by the addition of propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and propylene oxide; and the poly(oxybutylene) glycols and copolymers such as poly(oxyethylene-oxybutylene) glycols and poly (oxypropylene-oxybutylene) glycols. Included in the term "poly(oxybutylene) glycols" are polymers of 1,2-butyleneoxide and 2,3-butyleneoxide.

Illustrative of further polyester polyol reactants that are useful in producing flexible polyester urethane foam in accordance with the process of this invention are the reaction products of any of the aforesaid polycarboxylic acids and the polyhydric alcohols prepared by the reaction of one or more alkylene oxides such as ethylene oxide, propylene oxide, butylene oxide and mixtures thereof, with any of the following: glycerol; trimethylolpropane; 1,2,6-hexanetriol; pentaerythritol; sorbitol; glycosides such as methyl, ethyl, propyl, butyl and 2-ethylhexyl arabinoside, xyloside, fructoside, glucoside, and rhammoside, sucrose; mononuclear polyhydroxybenzenes such as resorcinol, pyrogallol, phloroglucinol, hydroquinone, 4,6-di-tertiarybutylcatechol, and catechol; polynuclear hydroxybenzenes ("polynuclear" designating at least two benzene nuclei) such as the di-, tri- and tetraphenylol compounds in which two to four hydroxybenzene groups are attached either directly by means of single bonds or through an aliphatic hydrocarbon radical containing one to twelve carbon atoms, such compounds being typically illustrated by 2,2-bis(p-hydroxyphenyl)-propane, bis(p-hydroxyphenyl)-methane and the various diphenols and diphenol methanes disclosed in U.S. Pat. Nos. 2,506,486 and 2,744,882, respectively. Another type of polyester polyol reactant is that produced by reaction of a polycarboxylic acid and the polyether adducts formed by reaction of ethylene oxide, propylene oxide or butylene oxide with phenol-formaldehyde condensation products such as the novolaks.

The organic polyisocyanates that are useful in producing flexible polyester urethane foam in accordance with the process of this invention are organic compounds that contain at least two isocyanato groups. Such compounds are well known in the art of producing polyurethane foams, and are conveniently represented by the general formula:

$$Q(NCO)_i$$

wherein $i$ is an integer of two or more and Q is an organic radical having the valence of $i$. Q can be a substituted or unsubstituted hydrocarbon group (e.g., alkylene, cycloalkylene, arylene, alkarylene, aralkylene and the like). Q can also be a group having the formula Q'—Z'—Q' wherein Q' is an alkylene or arylene group and Z is a divalent moiety such as —O—, —O—Q'—O—, —C(O)—, —S—, —S—Q'—S—, or —SO$_2$—.

Illustrative of suitable organic polyisocyanate reactants are the following including mixtures thereof: 1,2-diisocyanato-ethane; 1,3-diisocyanatopropane; 1,4-diisocyanato-butane; 1,5-diisocyanatopentane; 1,6-diisocyanato-hexane; 1,5-diisocyanato-2,2-dimethyl-pentane; 1,7-diisocyanato-heptane; 1,5-diisocyanato-2,2,4-trimethyl-pentane; 1,8-diisocyanato-octane; 1,9-diisocyanato-nonane; 1,10-diisocyanato-decane; 1,11-diisocyanato-undecane; 1,12-diisocyanato-dodecane; 1,6-diisocyanato-3-methoxy-hexane; 1,6-diisocyanato-3-butoxy-hexane; bis(3-isocyanatopropyl)ether; the bis(3-isocyanato-propyl)ether of 1,4-butylene glycol; (OCNCH$_2$CH$_2$CH$_2$OCH$_2$)$_2$O; bis(2-isocyanatoethyl)carbonate; 1-methyl-2,4-diisocyanatocyclohexane; 1,8-diisocyanato-p-menthane; bis 5,6-(2-isocyanatoethyl)-bicyclo[2.2.1]-hept-2-ene; bis(3-isocyanato-propyl)sulfide; bis(isocyanatohexyl)sulfide; 1,4-phenylene-diisocyanate; 2,4-tolylenediisocyanate; 2,6-tolylene-diisocyanate; crude tolylene diisocyanates; xylylene diisocyanates; 4-chloro-1,3-phenylene-diisocyanate; 4-bromo-1,3-phenylene-diisocyanate; 4-nitro-(1,3 or 1,5)-phenylene-diisocyanate; 4-ethoxy-1,3-phenylene-diisocyanate; benzidine diisocyanate; toluidine diisocyanate; dianisidine diisocyanate; 2,4'- or 4,4'-diisocyanato-diphenyl ether; diphenylmethane-4,4'-diisocyanate; 4,4'-diisocyanatodibenzyl; isopropyl-benzene-alpha-4-diisocyanate; 1,5-diisocyanato-naphthalene; 1,8-diisocyanatonaphthalene; 9,10-diisocyanato-anthracene; triphenylmethane-4,4',4''-triisocyanate; 2,4,6-toluene triisocyanate; and many other organic polyisocyanates known to the polyurethane art. In general, the aromatically unsaturated polyisocyanates are preferred.

Also included among the isocyanates useful in the process of this invention are dimers and trimers of isocyanates and diisocyanates and polymeric diisocyanates such as those having the general formula:

$$[Q(NCO)_i]_j$$

in which $i$ and $j$ are integers of two or more, and/or (as additional components in the reaction mixtures) compounds of the general formula:

$$L'(NCO)_i$$

in which $i$ is one or more and L' is a monofunctional or polyfunctional atom or radical. Examples of this type include ethylphosphonic diisocyanate, C$_2$H$_5$P(O)(-NCO)$_2$; phenylphosphonic diisocyanate, C$_6$H$_5$P(O)(-NCO)$_2$; compounds containing an Si—NCO group, isocyanates derived from sulfonamides (QSO$_2$NCO), cyanic acid, thiocyanic acid, and compounds containing a metal —NCO radical such as tributyltin isocyanate.

Also useful in the preparation of the flexible polyester urethane foams of this invention are the polyisocyanates of the aniline-formaldehyde polyaromatic type which are produced by phosgenation of the polyamine obtained by acid-catalyzed condensation of aniline with formaldehyde. Poly(phenylmethylene) polyisocyanates of this type are available commercially under such trade names as PAPI, AFPI, Mondur MR, Isonate 390 P, NCO-120 and NCO-20. These products are low viscosity (50–500 centipoises at 25°C.) liquids having average isocyanato functionalities in the range of about 2.25 to about 3.2 or higher, depending upon the specific aniline-to-formaldehyde molar ratio used in the polyamine preparation.

Other useful polyisocyanates are combinations of diisocyanates with polymeric isocyanates containing more than two isocyanato groups per molecule. Illustrative of such combinations are: a mixture of 2,4-tolylene diisocyanate, 2,6-tolylene diisocyanate and the aforesaid poly(phenylmethylene) polyisocyanates; and a mixture of isomeric tolylene diisocyanates with polymeric tolylene diisocyanates obtained as residues from the manufacture of the diisocyanates.

The polyisocyanate reactant of the foam-producing reaction mixture is generally employed in an amount that provides from about 80 to about 150 percent, usually from about 90 to about 120 percent, of the stoichiometric amount of the isocyanato groups required to react with all of the hydroxyl groups of the polyester polyol reactant and any water present as a blowing agent. That is, the total —NCO equivalent to total active hydrogen equivalent is generally within the range of about 0.8 to about 1.50, usually about 0.9 to about 1.2, equivalents of —NCO per equivalent of active hydrogen.

The reaction mixtures employed to produce flexible polyester urethane foam in accordance with the teachings of the present invention also contain a catalyst for accelerating the isocyanate-reactive hydrogen reaction. This component usually comprises a tertiary amine and is typically illustrated by the following: N-methylmorpholine; N-ethylmorpholine; N-octadecylmorpholine (N-cocomorpholine); trimethylamine; triethylamine; tributylamine; trioctylamine; N,N,N'N'tetramethylethylenediamine; N,N,N',N'-tetramethyl-1,3butanediamine; triethanolamine; N,N-dimethylethanolamine; triisopropanolamine; N-methyldiethanolamine; bis(2-dimethylaminoethyl)ether [i.e., N,N-dimethyl-2-(2-dimethylaminoethoxy)ethylamine]; hexadecyldimethylamine; N,N-dimethylbenzylamine; triethylenediamine (i.e., 1,4-diazabicyclo-[2.2.2]-octane); the formate and other salts of triethylenediamine, oxyalkylene adducts of the amino groups of primary and secondary amines and other such amine catalysts which are well known in the art of flexible polyurethane foam preparation. Although metal-containing catalysts such as stannous octoate are usually employed in the preparation of flexible polyether urethane foam, such metal catalysts are not preferred in the manufacture of flexible polyester foam.

It is to be understood that the aforesaid amines may be used as essentially the sole amine catalyst of the reaction mixtures employed in this invention or any combination of two or more such amines may be employed. The amine catalyst may also be introduced into the reaction mixture in the form of a solvent solution containing from about 10 to about 80 weight percent of total active catalyst. Suitable carrier solvents of amine catalysts include water-soluble glycols such as diethylene glycol; dipropylene glycol; and 2-methyl-2,4-pentanediol.

The catalyst may also be used in combination with other additives such as any of the non ionic organic surfactants described above in connection with the solution compositions of this invention. Examples of non ionics which are especially useful as components of the catalyst solutions are the oxyethylated nonylphenol compounds represented by the general formula $C_9H_{19}-C_6H_4-(OC_2H_4)_k-OH$, wherein $k$ is a number having an average value of from about 9 up to about 20 or more, including average values of $k$ which are either whole or fractional numbers such as 9, 10.5, 15 and the like. When used, the non ionic organic surfactant may be present in an amount from about 10 to about 80 weight percent, based on the total weight of the catalyst solution. The catalyst solution may also include minor amounts of polysiloxane-polyoxyalkylene block copolymers and/or the organosilicone polymers of this invention.

It is to be understood that any of the aforesaid amine catalysts or solutions thereof can be added directly to the foam-producing reaction mixture or they can be added in premixed form with water and the polymeric organosilicone foam stabilizers of this invention. In the latter event, the catalyst is preferably added as a component of the above-described homogeneous aqueous premixtures of this invention.

The amine catalyst is present in the final foam-producing reaction mixture in an amount of from about 0.2 to about 8 parts by weight of active catalyst (that is, the amine exclusive of other components present in solutions thereof) per 100 parts by weight of the polyester polyol reactant.

Foaming can be accomplished by employing a minor amount of a polyurethane blowing agent such as water, in the reaction mixture, the reaction of water and isocyanate generating carbon dioxide blowing agent, or through the use of blowing agents which are vaporized by the exotherm of the reaction, or by a combination of the two methods. These various methods are known in the art. Thus, in addition to or in place of water, other blowing agents which can be employed in the process of this invention include methylene chloride, liquefied gases which have boiling points below 80°F. and above −60°F., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially flourinated and may also be otherwise halogenated. Suitable fluorocarbon blowing agents include trichloromonofluoromethane, dichlorodifluoromethane, 1,1-dichloro-1-fluoroethane, 1,1,1-trifluoro-2-fluoro-3,3-difluoro-4,4,4-trifluorobutane, hexafluorocyclobutene and octafluorocyclobutane. Another useful class of blowing agents include thermally unstable compounds which liberate gases upon heating, such as N,N'-dimethyl-N,N'-dinitrosoterephthalamide, and the like. The generally preferred method of foaming for producing flexible foams is the use of water or a combination of water plus a fluorocarbon blowing agent such as trichloromonofluoromethane.

The amount of blowing agent employed in the foaming reaction will vary with factors such as the density that is desired in the foamed product. Usually, however, from about 1 to about 30 parts by weight of the blowing agent per 100 parts by weight of the polyester polyol starting material is preferred.

The organic flame-retardants that can be employed in producing flame-retarded flexible polyester foams in accordance with the teachings of this invention can be chemically combined in one or more of the other materials used (e.g., in the polyester polyol), or they can be discrete chemical compounds added as such to the foam formulation. The flame-retardants preferably contain phosphorus or halogen, or both phosphorus and halogen. Flame-retardants of the discrete chemical compound variety include: 2,2-di(bromomethyl)-1,3-propanediol; tris(2-chloroethyl)phosphate [ClCH$_2$CH$_2$O)$_3$P(O)]; 2,3-dibromopropanol; brominated phthalate ester diols (e.g., from tetrabromophthalic anhydride and propylene oxide); oxypropylated phosphoric acid; polyol phosphites [e.g., tris-(dipropylene glycol)phosphite]; polyol phosphonates [e.g., bis(dipropylene glycol) hydroxymethane phosphonate]; tris(2,3-dichloropropyl)phosphate; tris(1,3-dichloropropyl)phosphate; tetrabromobisphenol-A; tetrabromophthalic anhydride; tetrachlorophthalic anhydride; chlorendic acid and its anhydride; diallyl chlorendate; 2,4,6-tribromophenol; pentabromophenol; bis(2,3-dibromopropyl)phosphoric acid or salts thereof; tris(1-bromo-3-chloroisopropyl)phosphate; brominated anilines and dianilines; di-poly(oxytethylene)hydroxymethyl phosphonate; O,O-diethyl-N,N-bis(2-hydroxyethyl)aminomethyl phosphonate; di-poly(oxypropylene) phenyl phosphonate; di-poly(oxypropylene) chloromethyl phosphonate; di-poly(oxypropylene) butyl phosphate; and other flame-retardants known to the art. Any of the aforesaid compounds may be used as essentially the sole flame-retardant or various combinations thereof may be used.

Those of the above flame-retardants of the discrete chemical compound variety which contain groups reactive with hydroxy or isocyanato groups can be used as reactants in producing the polyester polyols or can be reacted with organic polyisocyanates to produce modified polyols or polyisocyanates having chemically combined flame-retardant groups. Such modified polyester and polyisocyanates are useful as reactants in the process of this invention. In such cases, due regard must be given to the possible effect of the functionality of the compound on the other properties (e.g., degree of flexibility) of the resulting foam.

The flame retardant can be used in an amount from about 1 to about 25 parts by weight per 100 parts by weight of the polyester polyol reactant.

If desired, minor amounts of other additional ingredients can be employed for specific purposes in producing polyester urethane foams in accordance with the process of this invention. Thus the aforesaid inhibitors such as "Ionol" (which can also be added as components of the aqueous premixed solutions of this invention) can be added directly to the final foam formulations. Similarly, hexylene glycol can be added to the final formulation as a compression set additive, although it can also be introduced as a component of the solution compositions described herein. Paraffin oil can be added to regulate cell structure so as to coarsen cells and thereby reduce the tendency of the foam to split. Other additives that can be empolyed are dyes or pigments and anti-yellowing agents.

The process described herein for the production of flexible polyester urethane foam, can be carried out in accordance with the prepolymer technique by which the polyester polyol and polyisocyanate are prereacted such that a substantial amount of unreacted isocyanate groups remain. The resulting prepolymer is then combined with the foam stabilizers of this invention, amine catalyst and blowing agent. Usually, however, the process is carried out as a "one-shot" process in which the polyester polyol and polyisocyanate reactants are independently added to the foam-producing reaction mixture. The foaming and urethane-forming reactions occur without the application of external heat. Often the resulting foam is cured by heating the foam at a temperature between about 100°C. and about 150°C. for about 10 to about 60 minutes to eliminate any surface tackiness, as desired. It is to be understood that variations in process conditions and manipulative steps can be used as known in the art. For example, the various ingredients of the reaction mixture can be combined and the foaming reaction mixture poured into a mold, or the various ingredients can be combined and the foaming reaction mixture commenced and completed in a mold.

The relative amounts of the various components reacted in accordance with the above-described process for producing flexible polyester urethane foams are not narrowly critical. The polyester polyol and polyisocyanate, taken together, are present in the foam-producing formulation in a major amount. The relative amounts of these two components is the amount required to produce the urethane structure of the foam and such relative amounts are well known in the art. The source of the blowing action such as water, auxiliary blowing agents, amine catalyst and the organosilicone polymeric foam stabilizers are each present in a minor amount necessary to achieve the function of the component. Thus, the blowing agent is present in a minor amount sufficient to foam the reaction mixture, the amine catalyst is present in a catalytic amount (i.e., an amount sufficient to catalyze the reaction to produce the urethane at a reasonable rate), and the organosilicone polymers of this invention are present in a foam-stabilizing amount, that is, in an amount sufficient to stabilize the foam. The preferred amounts of these various components are as given hereinabove.

The flexible polyester urethane foams produced in accordance with this invention can be used in the same areas as conventional flexible polyester urethane foams. For example, they can be used as textile interliners, cushioning materials for seating and for packaging delicate objects, and as gasketing materials.

The following examples are offered as illustrative of the present invention and are not to be construed as limitative.

Molecular weights given in the examples for various polymer compositions of this invention, were measured by Gel Permeation Chromatography (abbreviated in the examples as "G.P.C.") using a calibration curve showing the relationship between the respective elution volumes established for dimethylsiloxane fluids of different molecular weights and the respective known molecular weights of such fluids. In establishing the calibration curve, the various dimethylsiloxane fluids were in solution in trichloroethylene solvent. In measuring the molecular weights of the polymers described herein, the elution volume observed for any particular polymer product (in trichloroethylene solvent) was equated with the corresponding elution volume of the calibration curve, and the molecular weight associated with that particular elution volume was assigned as the molecular weight of the polymer product. The use of Gel Permeation Chromatography for measuring molecular weights is discussed in "Polymer Fractionation" (ed. Manfred J. R. Cantow, Academic Press, Inc. New York 1967), pages 123–173, Chapter B4, entitled, "Gel Permeation Chromatography," by K. H. Altgelt and J. C. Moore.

The following Examples 1–9 illustrate the preparation of organosilicone polymers of the invention by the cohydrolysis-cocondensation reaction of: tetraethoxysilane as the A' reactant; dimethylchlorosilane bearing an organic-capped polyoxyethylene chain linked to the remaining valence of silicon through a trimethylene group, as the B' reactant; and trimethylchlorosilane as the C' reactant. The B' reactant in turn is prepared by the platinum-catalyzed hydrosilation reaction of dimethylchlorohydrosilane [H—Si(CH$_3$)$_2$Cl] and allyl alcohol-started polyoxyethylene ethers capped with either methoxy or benzyl groups, that is, polyethers having the respective average formulas, CH$_3$O—(C$_2$H$_4$O)$_d$CH$_2$CH=CH$_2$ and C$_6$H$_5$CH$_2$O—(C$_2$H$_4$O)$_d$CH$_2$CH=CH$_2$ wherein the average value of $d$ is within the range from about 6.3 to about 7.2. Such polyethers usually contain up to about 10 mole per cent of allyl-endblocked, hydroxyl-terminated polyoxyethylene ethers as impurities due to incomplete capping of the terminal hydroxyl groups. For convenience, the polyoxyethylene chains of the respective B' reactants and B units of the polymer products shown in Examples 1–4, 6 and 8 are expressed as though capping thereof had been complete. In the case of the polyether reactant employed to provide the B' reactant used in Examples 5, 7 and 9, residual hydroxyl groups were converted to acetoxy groups by treatment with acetic anhydride, employing the following procedure: An allyl alcohol-started, benzyl-capped polyoxyethylene ether (2,930 grams) was dissolved in 100 ml. of toluene followed by sparging to remove any water. The mixture was heated with acetic anhydride (224 grams) at 140°C. for 3 hours, and was then subjected to stripping under vacuum for 5 hours, followed by sparging at atmospheric pressure and 140°C. for 6 hours. The product has an average molecular weight of about 440 and is a mixture of compounds having the formula, $WO-(C_2H_4O)_dCH_2CY=CH_2$, and contains about 87 and 13 mole percent of $C_6H_5CH_2O(C_2H_4O)_dCH_2CH=CH_2$ and $CH_3C(O)-O(C_2H_4O)_dCH_2CH=CH_2$, respectively, wherein the the average value assigned to $d$ is about 6.6. For convenience, this mixture of polyethers is referred to in Example 5 as Polyether A.

EXAMPLE 1 a. Preparation of $CH_3O-(C_2H_4O)_{7.2}-C_3H_6-Si(CH_3)_2Cl$

To a three-necked flask equipped with stirrer, thermometer, condenser and dropping funnel there was charged: 400 grams (1.03 mole) of the allyl end-blocked polyether having an average molecular weight of 389 and the average composition, $CH_2=CHCH_2(OC_2H_4)_{7.2}OCH_3$; 250 ml. of toluene; and 15 parts per million of Pt added as chloroplatinic acid $(H_2PtCl_6)$. The mixture was heated to 60°C. and 94.62 grams (1 mole) of dimethylchlorohydrosilane, $H-Si(CH_3)_2Cl$, was then added at such a rate to maintain the reaction temperature at about 85°-95°C. After completion of the reaction, that is, when the presence of Si—H was no longer indicated, toluene solvent was removed by rotary evaporation to provide 480 grams of liquid product having the average composition, $CH_3O-(C_2H_4O)_{7.2}-C_3H_6-Si(CH_3)_2Cl$.

b. Preparation of Surfactant A

The apparatus employed in this example comprised a reaction flask equipped with thermometer, condenser and take-off head, dropping funnel and stirrer. The reaction flask was charged with trimethylchlorosilane (54.25 grams; 0.5 mole), tetraethoxysilane (166.67 grams; 0.8 mole), $CH_3O-(C_2H_4O)_{7.2}-C_3H_6-Si(CH_3)_2Cl$ (241.8 grams; 0.5 mole) prepared in accordance with paragraph (a) above, and 200 grams of xylene. Water (33.8 grams) was added to this mixture over a period of one hour without applying external heat. After the completion of water addition, the reaction mixture was heated up to 80°-90°C. and volatiles (ethanol-water-HCl azeotrope) were removed by fractional distillation over a period of about 3-4 hours. The reaction mixture was then cooled, neutralized with sodium bicarbonate and filtered. Removal of xylene by rotary evaporation at 50°C. and 1 mm. mercury pressure, afforded a viscous liquid reaction product (278 grams). The polymer product is designated herein as Surfactant A and, based on the relative molar proportions of reactants employed, the mole ratio (a:b:c) of the

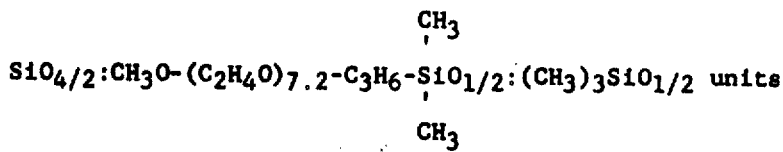

units contained therein is 1.6:1:1.

EXAMPLE 2

Preparation of Surfactant B

The reaction of this example was carried out in substantially the same manner described above with reference to Example 1(b), except that: the reaction mixture contained 350 ml. of xylene, 0.2 mole (21.7 grams) of trimethylchlorosilane, 0.8 mole (386 grams) of $CH_3O-(C_2H_4O)_{7.2}-C_3H_6-Si(CH_3)_2Cl$ prepared substantially as described in accordance with Example 1(a) above, and one mole (208.24 grams) of tetraethoxysilane; and the amount of water added thereto was 42 grams which includes about 20 weight percent in excess of stoichiometry. The liquid polymer product (440 grams) is designated herein as Surfactant B and, based on the relative molar proportions of reactants employed, the mole ratio (a:b:c) of the

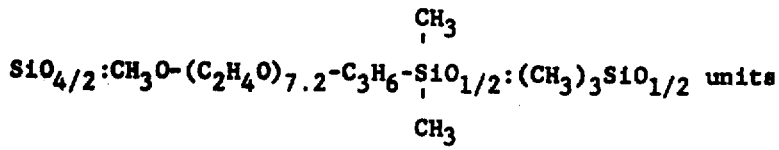

contained therein is 1.25:1:0.25.

EXAMPLE 3

Preparation of Surfactant C

In accordance with this example, a reaction mixture was prepared containing 200 ml. of xylene solvent, 83.2 grams (0.40 mole) of tetraethoxysilane, 4.34 grams (0.04 mole) of trimethylchlorosilane and 159.7 grams (0.36 mole) of a methoxy-capped polyether-substituted dimethychlorosilane having the average composition, $CH_3O-(C_2H_4O)_{6.3}-C_3H_6-Si(CH_3)_2Cl$. Water (19.8 grams) was added to the reaction mixture and the resulting mixture was stirred for about one hour. After removal of volatiles by distillation over a 4-hour period, the reaction mixture was cooled to 25°C., neutralized with sodium bicarbonate, filtered and stripped of solvent by rotary evaporation. The liquid polymer product (169 grams) has an average molecular weight (G.P.C.) of about 2,800. Based on the relative molar proportions of reactants employed, the mole ratio (a:b:c) of the

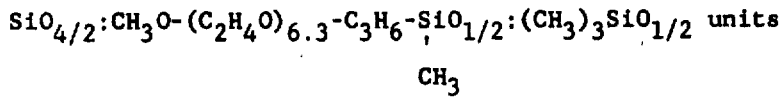

contained in the liquid polymer product, designated herein as Surfactant C, is about 1.1:1:0.11.

EXAMPLE 4

Preparation of Surfactant D

The reaction of this example was carried out in accordance with substantially the same procedure described under Example 3 employing the following reactants: 18.8 grams (0.1733 mole) of trimethylchlorosilane; 57.74 grams (0.2776 mole) of tetraethoxysilane; 90 grams (0.1735 mole) of a benzyl-capped polyether-substituted dimethylchlorosilane having an average molecular weight of about 518.5 and the average composition, $C_6H_5CH_2O(C_2H_4O)_dC_3H_6Si(CH_3)_2Cl$, where the average value of $d$ is about 6.3, prepared by the hydrosilation of an allyl-started, benzyl-capped polyether with $H-Si(CH_3)_2Cl$, as typically illustrated by the procedure of Example 1(a) above; and 14.4 grams of water. The liquid reaction product (106 grams) has an average molecular weight (G.P.C.) of about 3,000 and is designated herein as Surfactant D. Based on the relative molar proportions of reactants employed, the mole ratio (a:b:c) of the

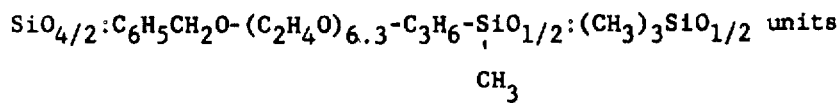

units contained in Surfactant D is about 1.6:1:1.

EXAMPLE 5

Preparation of Surfactant E

The reaction of this example was carried out in accordance with substantially the same procedure described under Example 3 above employing the following reactants: (i) 0.6 mole (124.8 grams) of tetraethoxysilane; (ii) 0.3 mole (32.6 grams) of trimethylchlorosilane; (iii) 0.3 mole (160.4 grams) of a mixture of polyether-substituted dimethylchlorosilanes having the average formula, $WO-(C_2H_4O)_{6.6}-C_3H_6-Si(CH_3)_2Cl$, wherein about 87 mole percent of the capping groups (W) are benzyl and about 13 mole percent are acetyl, this reactant having been prepared by the platinum-catalyzed addition reaction of $H-Si(CH_3)_2Cl$ to above-described Polyether A; and (iv) 1.65 moles (29.7 grams) of water. After removal of volatiles, neutralization and filtration, the liquid reaction product was found to have an average molecular weight (G.P.C.) of about 2,900. Based on the relative molar proportions of reactants employed, the mole ratio (a:b:c) of the

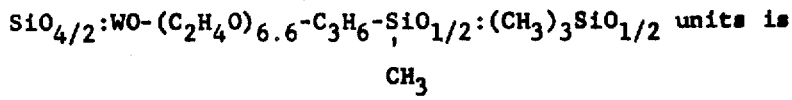

about 2:1:1, and about 87 mole percent of the polyether chains are capped with benzyl groups and the remaining groups are essentially acetyl; for convenience, this combination of capping groups (W) is expressed hereinafter as $C_6H_5CH_2/CH_3C(O)$. The polymer product of this example is designated herein as Surfactant E.

EXAMPLE 6

Preparation of Surfactant F

The reaction of this example was carried out in accordance with substantially the same procedure described in Example 3 employing the following reactants: 45.1 grams (0.2168 mole) of tetraethoxysilane; 4.7 grams (0.0433 mole) of trimethylchlorosilane; and 90 grams (0.1735 mole) of a benzyl-capped polyether-substituted dimethylchlorosilane having an average molecular weight of about 518.5 and the formula, $C_6H_5CH_2O(C_2H_4O)_dC_3H_6Si(CH_3)_2Cl$, wherein the average value of $d$ is about 6.3. After removal of volatiles, neutralization and filtration, the liquid reaction product was found to have an average molecular weight (G.P.C.) of about 3,450. Based on the relative molar proportions of reactants employed, the mole ratio (a:b:c) of the

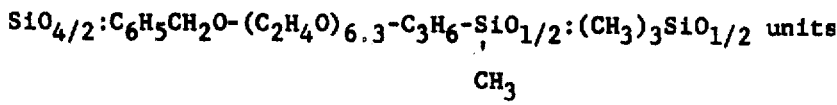

units in the polymer product, designated herein as Surfactant F, is about 1.25:1:0.25.

EXAMPLE 7

Preparation of Surfactant G

The reaction of this example was carried out in apparatus comprising a 1-liter, three-necked flask equipped with heating mantle, magnetic stirrer, Vigeraux column and dropping funnel. The reaction mixture contained: 0.065 mole (7.05 grams) of trimethylchlorosilane; 0.262 mole (140 grams) of the benzyl-capped, acetoxy-scavenged polyoxyethylene-substituted dimethyl-chlorosilane described as reactant (iii) in Example 5 above; 0.197 mole (40.9 grams) of tetraethoxysilane; and 200 ml. of xylene. Water was added (11.0 grams; 0.613 mole) over a period of 1 hour. After standing overnight at ambient temperature, the reaction mixture was distilled over a period of 4 hours, the head temperature being 138°C. The mixture was then cooled to 25°C., neutralized with sodium bicarbonate, filtered and solvent removed by rotary evaporation. The liquid polymer product is designated herein as Surfactant G. Based on the relative molar proportions of reactants employed, the mole ratio (a:b:c) of the

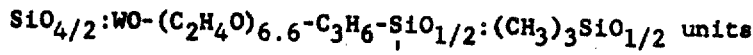

units contained in Surfactant G is about 0.75:1:0.25, the polyoxyethylene chains being capped (W) with C$_6$H$_5$CH$_2$/CH$_3$C(O), as defined with particular reference to Surfactant E of Example 5.

EXAMPLE 8

Preparation of Surfactant H

The reaction of this example was carried out substantially as described in Example 3 above employing the following reactants: 0.05 mole (5.43 grams) of trimethylchlorosilane; 0.2 mole (103.7 grams) of C$_6$H$_5$CH$_2$-O—(C$_2$H$_4$O)$_{6.3}$—C$_3$H$_6$—Si(CH$_3$)$_2$Cl; 0.2 mole (41.6 grams) of tetraethoxysilane; and 0.99 mole (17.8 grams) of water. After removal of volatiles, neutralization and filtration, the liquid reaction product was found to have an average molecular weight (G.P.C.) of about 3,300. Based on the relative molar proportions of reactants employed, the mole ratio (a:b:c) of the

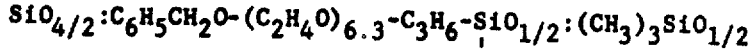

units in the polymer product, designated herein as Surfactant H, is about 1:1:0.25.

EXAMPLE 9

Preparation of Surfactant J

The reaction of this example was carried out in substantially the same manner described in Example 7 above employing the following amounts of reactants: 0.262 mole (28.4 grams) of trimethylchlorosilane; 0.262 mole (140 grams) of the benzyl-capped, acetoxy-scavenged polyoxyethylene-substituted dimethyl-chlorosilane described as reactant (iii) of Example 5 above; 0.314 mole (65.4 grams) of tetraethoxysilane; and 0.98 mole (17.6 grams) of water. The liquid reaction product remaining after removal of volatiles, neutralization and filtration is designated herein as Surfactant J. Based on the relative molar proportions of reactants employed, the mole ratio (a:b:c) of the

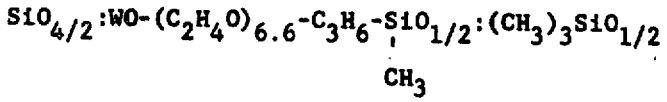

units in Surfactant J is 1.2:1:1, the polyoxyethylene chains being primarily benzyl-capped, remaining chains being capped with acetoxy as described with particular reference to Surfactant E of Example 5.

For the purpose of comparison, data are also presented herein based on organosilicone polymers containing A, B and C units in relative proportions not within the relative mole proportions defined by the present invention. These comparative polymers are designated herein as Polymers I, II, III and IV. In the preparation of Polymers I, II and III, the procedure described under Example 1(b) above was substantially followed and the polyether-substituted dimethyl-chlorosilane reactant employed had the average composition, CH$_3$O—(C$_2$H$_4$O)$_{7.2}$—C$_3$H$_6$—Si(CH$_3$)$_2$Cl, and was prepared as typically illustrated under Example 1(a) above. In the preparation of Polymer IV, the procedure described under Example 7 herein was followed and the B' reactant was also derived by the platinum-catalyzed hydrosilation of the abovedescribed Polyether A with H—Si(CH$_3$)$_2$Cl. The reactants, amounts thereof and the relative proportions of the A and C units per mole of B units present in the polymer products are given in the following Table I.

TABLE I

| Preparation No. | 1 | 2 | 3 | 4 |
|---|---|---|---|---|
| Polymer No. | *I | *II | *III | *IV |
| Reactants | | | | |
| $Si(OC_2H_5)_4$ | | | | |
|   grams | 166.7 | 333.3 | 333.3 | 31.2 |
|   mole | 0.8 | 1.6 | 1.6 | 0.15 |
| $WO\text{-}(C_2H_4O)_d\text{-}C_3H_6\text{-}Si(CH_3)_2Cl$ | | | | |
|   W | $CH_3$ | $CH_3$ | $CH_3$ | $C_6H_5CH_2/CH_3CO$ |
|   Molecular Weight | 483.6 | 483.6 | 483.6 | 534.5 |
|   Average Value of $d$ | 7.2 | 7.2 | 7.2 | 6.6 |
|   grams | 120.9 | 96.7 | 48.3 | 160.4 |
|   mole | 0.25 | 0.20 | 0.1 | 0.3 |
| $(CH_3)_3SiCl$ | | | | |
|   grams | 81.39 | 86.8 | 97.65 | 7.1 |
|   mole | 0.75 | 0.8 | 0.9 | 0.075 |
| Water, grams | 37.2 | 73.26 | 73.26 | 9.7 |
| Xylene Solvent, ml. | 200 | 500 | 500 | — |
| Polymer Product | | | | |
| Weight, grams | 214.0 | 227 | 217 | — |
| Mole Ratio of Units, a:b:c /1/ | 3.2:1:3.0 | 8.0:1:4.0 | 16:1:9 | 0.5:1:0.25 |

*Not a polymer of the invention.

/1/ Designates the mole ratio of the $SiO_{4/2}$:$WO\text{-}(C_2H_4O)_d\text{-}C_3H_6\text{-}Si(CH_3)_2O_{1/2}$:$(CH_3)_3SiO_{1/2}$ units, respectively, based on the relative molar proportions of reactants employed.

EXAMPLES 10–18

In these examples, foams were produced using the above-described Surfactants A through H and J of the present invention as the respective foam-stabilizing surfactant component of the foam-producing reaction mixture, designated herein as Foam Formulation A, which had the following composition:

TABLE II

FOAM FORMULATION A

| COMPONENT | PARTS BY WEIGHT |
|---|---|
| Surfactant | Varied (0.35, 0.5 and 1) |
| Polyester polyol /1/ | 100.0 |
| N-ethylmorpholine | 1.9 |
| Hexadecyldimethylamine | 0.3 |
| Water | 3.6 |
| Tolylene diisocyanate (Index 105) /2/ | 45.2 |
| Tris(2-chloroethyl)phosphate | 7.0 |

/1/ The polyester polyol employed was a commercially available polyester resin produced from adipic acid, diethylene glycol and trimethylolpropane in a mole ratio of approximately 1:1:0.2. This polyester has a hydroxyl number of about 50 to 56, a molecular weight of about 2,000, an acid number not greater than 2 and a viscosity of about 17,000 centistokes at about 25°C. This particular polyester is sold under the name "Witco Fomrez No. 50".

/2/ This component was a mixture of the 2,4- and 2,6-isomers of tolylene diisocyanate present in a weight ratio of 80:20, respectively. Index 105 designates that the amount of mixture employed was 105 weight per cent of the stoichiometric amount required to react with total reactive hydrogens from the polyester polyol and water present in the foam formulation.

The runs of Examples 10–18 were carried out in accordance with substantially the same general procedure which entailed the following steps. The foam stabilizing surfactant, amine catalysts and water were premixed in a four-ounce capacity jar. The polyester polyol reactant was weighed into a tared container. The flame-retardant [tris(2-chloroethyl)phosphate] and tolylene diisocyanate reactant were also weighed into the container and mixed with a spatula. Further mixing of the polyol, flame-retardant and diisocyanate was done in a drill press equipped with a double three-bladed marine-type propellor about 2 inches in diameter and having a 45° pitch. The mixing in the drill press was accomplished at 1,000 revolutions per minute for 8 seconds. Then the premixture of surfactant, catalyst and water was added and mixing was continued for seven additional seconds. The reaction mixture was poured into a cardboard box (12 × 12 × 12 inches), allowed to rise and was then cured for about 30 minutes at 130°C. In most instances, samples were prepared for breathability and flammability measurements.

The following terms are used to describe the quality of the foams produced in the examples:

"Rise" denotes the foam height and is directly proportional to potency of the surfactant.

"Breathability" denotes the porosity of a foam, being roughly proportional to the number of open cells in a foam, and was measured in accordance with the NOPCO breathability test procedure described by R. E. Jones and G. Fesman, Journal of Cellular Plastics, January, 1965. In accordance with this test, breathability is measured as follows: A piece of foam (1 × 2 × 2 inches) is cut from near the center of the bun. Using a Nopco Foam Breathability Tester, Type GP-2 Model 40GD10, air is drawn through the 1-inch portion at a pressure differential of 0.5 inches of water less than atmospheric pressure. The air flow is parallel to direction of original foam rise. The degree of openness of the foam (or foam breathability) is measured by air flow and is expressed as standard cubic feet per minute (SCFM).

"Burning Extent" denotes the burned length of a test specimen of foam as measured in accordance with standard flammability test procedure ASTM 1692–57T.

"SE" indicates that, on the basis of the results obtained in the aforesaid flammability test, the foam is rated as self-extinguishing.

"B" indicates that on the basis of the aforesaid flammability test, the sample of foam did not qualify as self-extinguishing and was thus assigned a "burning" (B) rating.

The results based on the use of Surfactants A, B and C at three different concentrations are given in the following Table III as Examples 10–12, the polyoxyethylene chains of Surfactants A–C being capped with methyl groups. Table III also sets forth data (Run Nos. I–III) obtained using the above-described comparative Polymers I, II and III the polyether chains of which were also methyl-capped. In comparative Runs I–III, Foam Formulation A and the above-described foaming procedure were also employed.

Surfactant A provided a "burner" when used in a concentration of one part per 100 parts of polyester polyol, it allowed for the formation of self-extinguishing foams when used at the lower concentrations.

TABLE III

Stabilization of Flexible Polyester Foam Using Surfactants Containing $SiO_{4/2}$, $CH_3O-(C_2H_4O)_d-C_3H_6-Si(CH_3)_2O_{1/2}$ and $(CH_3)_3SiO_{1/2}$ units in the mole ratio (a:b:c) indicated below, and wherein the average value of d is 7.2 (Surfactants A, B and Polymers I-III) or 6.3 (Surfactant C).

| | Surfactant | | | Foam Properties | | | |
|---|---|---|---|---|---|---|---|
| Example No. | Designation | a:b:c | Parts by Wt. in Foam Formulation A | Rise (inches) | Breathability (SCFM) | Burning Extent (inches) | Flame Rating |
| 10-1 | A | 1.6:1:1 | 0.35 | 5.7 | 3.4 | 4.4 | SE |
| 10-2 | A | 1.6:1:1 | 0.5 | 5.8 | 3.0 | 4.8 | SE |
| 10-3 | A | 1.6:1:1 | 1.0 | 5.8 | 3.0 | 5.0 | B |
| 11-1 | B | 1.25:1:0.25 | 0.35 | 5.8 | 0.8 | 1.5 | SE |
| 11-2 | B | 1.25:1:0.25 | 0.5 | 6.0 | 2.0 | 2.1 | SE |
| 11-3 | B | 1.25:1:0.25 | 1.0 | 5.8 | 2.7 | 2.5 | SE |
| 12-1 | C | 1.1:1:0.11 | 0.35 | 6.0 | 0.7 | 1.4 | SE |
| 12-2 | C | 1.1:1:0.11 | 0.5 | 6.0 | 1.9 | — | SE |
| 12-3 | C | 1.1:1:0.11 | 1.0 | 6.0 | 2.5 | 2.3 | SE |
| Run.No. | Polymer | | | | | | |
| I-1 | *I | 3.2:1:3.0 | 0.35 | Collapse | — | — | — |
| I-2 | *I | 3.2:1:3.0 | 1.0 | Sea Sponge | — | — | — |
| II | *II | 8.0:1:4.0 | 1.0 | Collapse | — | — | — |
| III | *III | 16:1:9 | 1.0 | Collapse | — | — | — |

*Not a polymer of the invention.

The data of Examples 10–12 of Table III show that Surfactants A, B and C of the present invention are effective stabilizers of flexible polyester-based urethane foams. On the other hand, Polymers I, II and III were ineffective for this purpose. In addition to having good potency as foam stabilizers, the results of Table III also show that, overall, Surfactants A, B and C possess the further desirable property of allowing for formation of self-extinguishing, flame-retarded foams. Although The results obtained in Examples 13–18 in which Surfactants D through H and J were used are presented in the following Table IV which also sets-forth data (Run No. IV) obtained using the above-described comparative Polymer IV as the surfactant component of Foam Formulation A. The polyoxyethylene chains of Surfactants D–H and J and of Polymer IV were capped with benzyl or a combination of benzyl and acetyl groups, as above described.

TABLE IV

Stabilization of Flexible Polyester Foam Using Surfactants Containing $SiO_{4/2}$, $WO-(C_2H_4O)_d-C_3H_6-Si(CH_3)_2O_{1/2}$ and $(CH_3)_3SiO_{1/2}$ units in the mole ratio (a:b:c) given below, and wherein WO— is either benzyloxy or acetoxy and the average value of d is about 6.3 or 6.6.

| | Surfactant | | | | Foam Properties | | | |
|---|---|---|---|---|---|---|---|---|
| Example No. | Designation | | a:b:c | Parts by Wt. in Foam Formulation A | Rise (inches) | Breathability (SCFM) | Burning Extent (inches) | Flame Rating |
| 13-1 | D | /1/ | 1.6:1:1 | 0.35 | 5.6 | 2.5 | 1.2 | SE |
| 13-2 | D | | 1.6:1:1 | 0.5 | 5.6 | 2.6 | 1.5 | SE |
| 13-3 | D | | 1.6:1:1 | 1.0 | 5.6 | 3.0 | 1.7 | SE |
| 14-1 | E | /2/ | 2:1:1 | 0.35 | 5.0 | 1.0 | 1.3 | SE |
| 14-2 | E | | 2:1:1 | 1.0 | 5.8 | 2.1 | 1.8 | SE |
| 15-1 | F | /1/ | 1.25:1:0.25 | 0.35 | 5.5 | 0.7 | 1.1 | SE |
| 15-2 | F | | 1.25:1:0.25 | 0.5 | 5.8 | 0.7 | 1.2 | SE |
| 15-3 | F | | 1.25:1:0.25 | 1.0 | 5.8 | 2.0 | 1.3 | SE |
| 16 | G | /2/ | 0.75:1:0.25 | 0.35 | 5.6 | 0.9 | 1.2 | SE |
| 17-1 | H | /1/ | 1.0:1:0.25 | 0.35 | 5.5 | 0.7 | — | |
| 17-2 | H | | 1.0:1:0.25 | 0.5 | 5.4 | 1.5 | — | |
| 17-3 | H | | 1.0:1:0.25 | 1.0 | 5.8 | 2.0 | — | |
| 18-1 | J | /2/ | 1.2:1:1 | 0.35 | 5.4 | 3.0 | 1.4 | SE |
| 18-2 | J | | 1.2:1:1 | 0.5 | 5.4 | 3.0 | — | — |
| 18-3 | J | | 1.2:1:1 | 1.0 | 5.4 | 3.0 | — | — |
| Run No. | Polymer | | | | | | | |
| IV-1 | *IV | /2/ | 0.5:1:0.25 | 0.35 | Collapse | — | — | — |
| IV-2 | *IV | | 0.5:1:0.25 | 1.0 | Sea Sponge | — | — | — |

*Not a polymer of the invention.
/1/ The organic capping group (W) of the polyoxyethylene chains is $C_6H_5CH_2-$ and the average value of d is about 6.3.
/2/ The organic capping group (W) of the polyoxyethylene chains is $C_6H_5CH_2-/CH_3C(O)-$ and the average value of d is about 6.6.

The results of Table IV indicate that overall, Surfactants D through H and J of this invention have a good combination of potency and processing latitude as stabilizers of flexible polyester foam including flameretarded foams whereas comparative Polymer IV was ineffective for this purpose.

EXAMPLES 19-23

In these examples, a potency determination was made of surfactants of this invention using a foam formulation, designated as Foam Formulation B, which contained 5 parts by weight of water per 100 parts by weight of polyester polyol reactant. The composition of Foam Formulation B is as follows:

TABLE V

FOAM FORMULATION B

| COMPONENT | PARTS BY WEIGHT |
|---|---|
| Surfactant | 0.35 |
| Polyester polyol /1/ | 100.0 |
| N-ethylmorpholine | 1.9 |
| Hexadecyldimethylamine | 0.3 |
| Water | 5.0 |
| Tolylene diisocyanate (Index 105) /2/ | 59.4 |

/1/ The polyol employed was the same as that of Foam Formulation A and is identified in footnote /1/ of Table II.
/2/ The isocyanate employed was the same as that of Foam Formulation A and is identified in footnote /2/ of Table II.

Each of Examples 19-23 was carried out using the general procedure described above with reference to Examples 10-18. The mole ratio (a:b:c) of the A, B and C units of Surfactants A-D and F employed in these examples and the results are given in Table VI below. A blended surfactant composition, designated herein as Surfactant V, comprising a polyoxyalkylene-polysiloxane block copolymer in combination with an anionic organic surfactant, was also used as the surfactant component of Foam Formulation B in a concentration of 0.35 part by weight per 100 parts of the polyester polyol reactant, following substantially the same general procedure described above with reference to Examples 10-18. The composition of Surfactant V and the results obtained therewith are also included in Table VI.

The results of Table VI show that Surfactants A-D and F of this invention provide foams of excellent rise even at the relatively low concentration of 0.35 part by weight per 100 parts by weight of the polyester polyol reactant and that their potency as foam stabilizers compares favorably with that of Surfactant V. However, when comparative Surfactant V was used as the foam stabilizing surfactant component of flame-retarded Foam Formulation A at a concentration of one part (or 0.35 parts of the polyoxyalkylene-polysiloxane block copolymer contained therein) per 100 parts of polyester polyol, the following results were obtained:

| Rise, inches | 5.6 |
|---|---|
| Breathability, SCFM | 2.2 |
| Flame Rating | Burns |

In the runs summarized in the following Table VII, other polymers, designated herein as Polymers VI-XI which are not within the scope of the present invention, were used as the "surfactant" component of Foam Formulation A of Table II above. These polymers are identified as follows:

Polymer VI contains $SiO_{4/2}$ units and the two types of monofunctional units, $(CH_3)_3SiO_{1/2}$ and

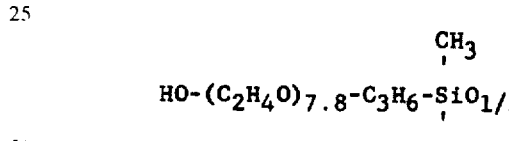

in a mole ratio of 1.6:1:1, respectively; the mole ratio of $SiO_{4/2}$: total monofunctional units, normalized on the basis of 1 mole of $SiO_{4/2}$, is 1:1.25.

Polymer VII contains $SiO_{4/2}$ and $(CH_3)_3SiO_{1/2}$ units in a mole ratio of 1:1 and was used as a 50 weight per cent solution in xylene.

Polymer VIII is a commercially available product designed for use in the manufacture of polyvinyl chloride foams. It is supplied in about a 50 weight percent solution in xylene having a viscosity of 6 centistokes at 77°F. and a specific gravity of 1.00 at 77°F. On the basis of analytical data, it is believed that this polymer contains $SiO_{4/2}$ and $(CH_3)_3SiO_{1/2}$ units in a mole ratio of 1:0.8, respectively.

TABLE VI

Stabilization of Flexible Polyester Foam Using Surfactants Containing $SiO_{1/2}$, $WO-(C_2H_4O)_d-C_3H_6-Si(CH_3)_2O_{1/2}$, and $(CH_3)_3SiO_{1/2}$ units in the mole ratio (a:b:c) given below, and wherein W is methyl (Surfactants A, B and C) or benzyl (Surfactants D and F).

| Example | Surfactant | a:b:c | Parts by Wt. in Foam Formulation B | Rise (inches) | Cell Structure |
|---|---|---|---|---|---|
| 19 | A | 1.6:1:1 | 0.35 | 8.2 | Excellent |
| 20 | B | 1.25:1:0.25 | 0.35 | 8.8 | Coarse |
| 21 | C | 1.1:1:0.11 | 0.35 | 8.8 | Coarse |
| 22 | D | 1.6:1:1 | 0.35 | 9.0 | Excellent |
| 23 | F | 1.25:1:0.25 | 0.35 | 9.0 | Excellent |
| Run V | *Surfactant V /1/ | — | 0.35 | 8.1 | Coarse |

*Not a surfactant of this invention.
/1/ Composition of Surfactant V (weight per cent basis):
(a) 35 $Me_3SiO(Me_2SiO)_8 \cdot [MeO(C_2H_4O)_{7.8}C_3H_6SiMeO]_{7.5}SiMe_3$ wherein Me designates methyl.
(b) 35 Sodium sulfonate of a petroleum hydrocarbon mixture having a typical analysis (weight percent): 62.0 sodium sulfonate, 32.7 mineral oil, 4.5 water, 0.7 inorganic salt, average molecular weight (of sulfonate portion) is 435; flash point, C.O.C., 400°F., and sold commercially under the name "Bryton 430".
(c) 15 Tall Oil
(d) 15 Hexylene Glycol
(e) 2500 parts of "Ionol" per million parts of components (a) to (d).

Polymer IX consists essentially of $SiO_{4/2}$ and

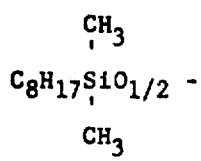

units in a mole ratio of 1.6:1, respectively,
and was prepared as follows: The reaction apparatus comprised a reaction flask equipped with thermometer, condenser and take-off head, dropping funnel and stirrer. To a mixture of dimethyloctylchlorosilane (103.41 grams, 0.5 mol) and tetraethoxysilane (166.6 grams, 0.8 mol) in 300 grams of xylene was added water (37.18 grams) over a period of 1 hour without applying external heat. After the completion of water addition, the reaction mixture was heated up to 80°–90°C. and volatiles (ethanol-water-HCl azeotrope) were removed by fractional distillation within about 4 hours. The reaction mixture was then cooled, neutralized with sodium bicarbonate and filtered. Removal of xylene by rotary evaporation at 50°C./1 mm. afforded a liquid product (139.6 grams), designated herein as Polymer IX.

Polymer X consists essentially of $SiO_{4/2}$ and the two types of monofunctional units $(CH_3)_3SiO_{1/2}$ and

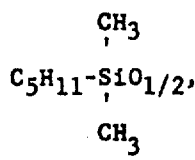

in a mole ratio of about 9.6:5:1, respectively, the mole ratio of $SiO_{4/2}$: total monofunctional units, normalized on the basis of 1 mole of $SiO_{4/2}$, is about 1:0.62. Polymer X was provided as follows: A mixture was prepared containing trimethylchlorosilane (59.7 grams; 0.55 mole), dimethylpentylchlorosilane (18.5 grams; 0.11 mole) and tetraethoxysilane (219.6 grams; 1.06 mole). Water (48.5 grams) was slowly added thereto and the reaction mixture was stirred overnight. After removal of volatiles, neutralization and filtration, a very viscous product (117 grams), designated herein as Polymer X, was provided.

Polymer XI consists essentially of $SiO_{4/2}$ and two types of monofunctional units, $(CH_3)_3SiO_{1/2}$ and $$C_{12}H_{25}-\underset{CH_3}{\overset{CH_3}{Si}}O_{1/2},$$

in a mole ratio of about 6:1:1, respectively; the mole ratio of $SiO_{4/2}$: total monofunctional units, normalized on the basis of one mole of $SiO_{4/2}$, is about 1:0.33. Polymer XI was prepared from a reaction mixture containing trimethylchlorosilane (10.9 grams; 0.1 mole), dimethyldodecylchlorosilane (26.2 grams; 0.1 mole), tetraethoxysilane (124.8 grams; 0.6 mole) and water (25.7 grams). The product (69.5 grams), was a very viscous liquid containing some solids, and was thus dissolved in 69.5 grams of xylene. Polymer XI was employed as the resulting 50 weight percent solution in xylene.

The runs of Table VII were carried out following the general procedure described above with specific reference to Examples 10–18. The concentration of Polymers VI–XI employed in each run is also given in Table VII.

TABLE VII

| Run | Surfactant | | Parts by Weight in Foam Formulation A | | Rise (inches) |
|---|---|---|---|---|---|
| VI | *Polymer VI | /1/ | 0.35 | | Severe Shrinkage |
| VII | *Polymer VII | /2/ | 1 | /4/ | Boiled |
| VIII | *Polymer VIII | /3/ | 1 | /4/ | Collapsed |
| IX | *Polymer IX | /5/ | 1 | | Collapsed |
| X | *Polymer X | /6/ | 1 | | Collapsed |
| XI | *Polymer XI | /7/ | 1 | | Collapsed |

*Not a polymer of this invention.
/1/ $SiO_{4/2}$:[HO—$(C_2H_4O)_{7.8}$—$C_3H_6$—$Si(CH_3)_2O_{1/2}$ + $(CH_3)_3SiO_{1/2}$] = 1:1.25
/2/ $SiO_{4/2}$:$(CH_3)_3SiO_{1/2}$ = 1:1; employed as a 50 weight percent solution in xylene.
/3/ $SiO_{4/2}$:$(CH_3)_3SiO_{1/2}$ believed to be 1:0.8; employed as a 50 weight percent solution in xylene.
/4/ Basis, weight of dissolved polymer exclusive of weight of xylene solvent.
/5/ $SiO_{4/2}$:$C_8H_{17}Si(CH_3)_2O_{1/2}$ = 1.6:1
/6/ $SiO_{4/2}$:[$(CH_3)_3SiO_{1/2}$ + $C_5H_{11}Si(CH_3)_2O_{1/2}$] = 1:0.62
/7/ $SiO_{4/2}$:[$(CH_3)_3SiO_{1/2}$ + $C_{12}H_{25}Si(CH_3)_2O_{1/2}$] = 1:0.33, employed as a 50 weight percent solution in xylene.

The results of Table VII show that Polymers VI–XI failed to perform as effective stabilizers of flexible polyester foam.

EXAMPLE 24

In accordance with this example, a series of solutions are prepared by blending Surfactant D produced in Example 4, with various organic additives. The solutions are designated herein as Surfactant Blends D-1 to D-5 and have the following compositions:

| Surfactant Blend | Component | Parts By Weight |
|---|---|---|
| D-1 | Surfactant D | 0.35 |
| | Tall Oil | 0.15 |
| | Hexylene glycol | 0.15 |
| D-2 | Surfactant D | 0.35 |
| | Tall Oil | 0.20 |
| | Hexylene glycol | 0.20 |
| D-3 | Surfactant D | 0.35 |
| | Tall Oil | 0.25 |
| | Hexylene glycol | 0.15 |
| D-4 | Surfactant D | 0.35 |
| | Tall Oil | 0.15 |
| | Hexylene glycol | 0.15 |
| | Diethylamine sulfonate | 0.35 |
| D-5 | Surfactant D | 0.35 |
| | Tall Oil | 0.15 |
| | CARBOWAX 400 (polyethylene glycol having a formula molecular weight range of 380–420) | 0.15 |
| | Diethylamine sulfonate | 0.35 |

When Surfactant Blends D-1 to D-5 are used as the surfactant components of Foam Formulation A identified in Table II above, the results are as follows:

TABLE VIII

| Surfactant Blend | Parts By Wt. in Foam Formulation A | Rise (inches) | Breathability (SCFM) | Burning Extent (inches) |
|---|---|---|---|---|
| D-1 | 0.65 | 5.8 | 2.6 | 1.5 |
| D-2 | 0.75 | 5.8 | 2.5 | 1.6 |
| D-3 | 0.75 | 5.7 | 2.5 | 1.6 |
| D-4 | 1 | 5.8 | 2.7 | 1.5 |
| D-5 | 1 | 5.8 | 2.4 | 1.6 |

The data of Table VIII illustrate that the solution compositions of this invention are also effective stabilizers of flame-retarded polyester-based urethane foams and are capable of providing foams of low burning extent.

What is claimed is:

1. An organosilicone polymer which consists essentially of monomeric units (A), (B) and (C) wherein: (A) is $SiO_{4/2}$; (B) is a monofunctional siloxy unit having the unit formula,

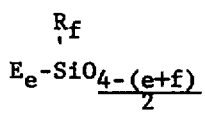

wherein E is a poly(oxyalkylene) chain an oxygen atom of which is linked to silicon through a bivalent hydrocarbon radical, said chain being terminated at its other end by a monovalent organic radical selected from the group consisting of $R^{\infty}O-$, $R^{\infty}NHC(O)O-$ and $R^{\infty}C(O)O-$ where $R^{\infty}$ is a monovalent hydrocarbon group having from 1 to 12 carbon atoms, R is a monovalent hydrocarbon group, $e$ is an integer having a value of from 1 to 3, $f$ has a value of zero to 2, and the sum $e+f$ has a value of 3; and (C) is a monofunctional trihydrocarbylsiloxy unit; and wherein the mole ratio of the aforesaid (A) units to said (B) units is from about 0.75:1 to about 2:1, and the mole ratio of the aforesaid (C) units to said (B) units is from about 0.1:1 to about 1:1.

2. The organosilicone polymer of claim 1 in which the (B) units consist essentially of those in which $e$ has a value of one and $f$ has a value of two.

3. The organosilicone polymer of claim 2 in which said R group has from 1 to 12 carbon atoms.

4. The organosilicone polymer of claim 1 in which the (B) units consist essentially of those in which $e$ has a value of two and $f$ has a value of one.

5. The organosilicone polymer of claim 1 in which the (B) units consist essentially of those in which $e$ has a value of three.

6. The organosilicone polymer of claim 1 in which (C) has the unit formula, $R°_3SiO_{1/2}$, wherein $R°$ is a monovalent hydrocarbon group having from 1 to 12 carbon atoms.

7. An organosilicone polymer which consists essentially of monomeric units (A), (B) and (C) where: (A) is $SiO_{4/2}$; (B) is a monofunctional unit having the formula,

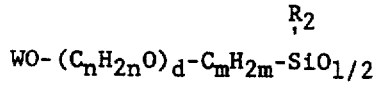

wherein R is a monovalent hydrocarbon radical having from one to 12 carbon atoms, $d$ has an average value of from about 5 to about 15, $n$ has a value of from 2 to 4 provided at least 75 per cent by weight of the poly(oxyalkylene) chain, $-(C_nH_{2n}O)_d-$, is constituted of oxyethylene units, $m$ has a value of from 2 to 4, and W is a monovalent organic radical selected from the group consisting of $R^{\infty}-$, $R^{\infty}NHC(O)-$ and $R^{\infty}C(O)-$ where $R^{\infty}$ is a monovalent hydrocarbon radical having from one to 12 carbon atoms; and (C) is a monofunctional siloxy unit having the formula, $R°_3SiO_{1/2}$, wherein $R°$ is a monovalent hydrocarbon radical having from one to 12 carbon atoms; and wherein there are from about 0.75 to about 2 moles of $SiO_{4/2}$ units per mole of said monofunctional units (B), and from about 0.1 to about 1 mole of said monofunctional units (C) per mole of monofunctional units (B).

8. The polymer of claim 7 wherein said monovalent hydrocarbon groups, R and $R°$, are lower alkyl groups.

9. An organosilicon polymer which consists essentially of monomeric: units (A), (B) and (C) where (A) is $SiO_{4/2}$, (B) is a monofunctional siloxy unit having the formula,

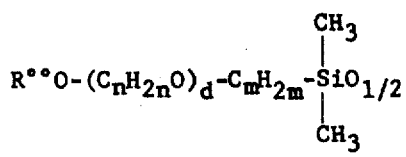

wherein $d$ has an average value from about 5 to about 15, $n$ has a value of from 2 to 4, provided at least 75 percent by weight of the poly(oxyalkylene) chain, $-(C_nH_{2n}O)_d-$, is constituted of oxyethylene units, $m$ has a value of from 2 to 4 and $R^{\infty}$ is a monovalent hydrocarbon radical having from 1 to 12 carbon atoms, and (C) is the monofunctional siloxy unit, $(CH_3)_3SiO_{1/2}$, and wherein the mole ratio of the $SiO_{4/2}$ units to said monofunctional (B) units is from about 0.75:1 to about 2:1, and the mole ratio of said monofunctional (C) units to said monofunctional (B) units is from about 0.1:1 to about 1:1.

10. The polymer of claim 9 in which $R^{\infty}$ is a lower alkyl radical.

11. The polymer of claim 10 in which $R^{\infty}$ is a methyl group.

12. The polymer of claim 9 in which $R^{\infty}$ is an aralkyl radical.

13. The polymer of claim 12 in which $R^{\infty}$ is a benzyl group.

14. An organosilicone polymer which consists essentially of monomeric units (A), (B) and (C) wherein: (A) is $SiO_{4/2}$; (B) is a monofunctional siloxy unit having the formula,

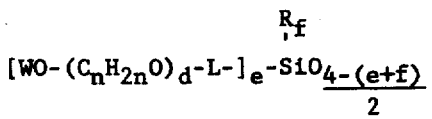

wherein R is a monovalent hydrocarbon group having from 1 to 12 carbon atoms, $d$ has an average value of from about 4 to about 30, $n$ has a value of from 2 to 4 provided at least 75 percent by weight of the poly(oxyalkylene) chain, $-(C_nH_{2n}O)_d-$, is constituted of oxyethylene units, —L— is a bivalent hydrocarbon radical having from 2 to 14 carbon atoms, W is a monovalent organic radical selected from the group consisting of $R^\infty-$, $R^\infty NHC(O)-$ and $R^\infty C(O)-$ where $R^\infty$ is a monovalent hydrocarbon radical having from one to 12 carbon atoms, $e$ has a value from 1 to 3 and $f$ is from 0 to 2, provided the sum $e+f$ is 3; and (C) is a monofunctional siloxy unit having the general formula, $R°_3SiO_{1/2}$, wherein $R°$ is a monovalent hydrocarbon group having from 1 to 12 carbon atoms; and wherein the mole ratio of said $SiO_{4/2}$ units to said (B) units is from about 0.75:1 to about 2:1 and the mole ratio of said (C) units to said (B) units is from about 0.1:1 to about 1:1.

15. The polymer of claim 14 in which W is said monovalent hydrocarbon radical, $R^\infty$.

16. The polymer of claim 15 in which $R^\infty$ is a lower alkyl radical.

17. The polymer of claim 16 in which said alkyl radical is methyl.

18. The polymer of claim 15 in which $R^\infty$ is an aryl group.

19. The polymer of claim 18 in which said aryl group is phenyl.

20. The polymer of claim 15 in which $R^\infty$ is an aralkyl group.

21. The polymer of claim 20 in which said aralkyl group is benzyl.

22. The polymer of claim 14 in which W is said $R^\infty C(O)-$ group.

23. The polymer of claim 22 in which $R^\infty$ of said $R^\infty C(O)-$ group is methyl.

24. The polymer of claim 14 in which W is said $R^\infty NHC(O)-$ group.

25. The polymer of claim 24 in which $R^\infty$ of said $R^\infty NHC(O)-$ group is methyl.

26. The polymer of claim 14 in which —L— is a bivalent alkylene group.

* * * * *